United States Patent
Endo et al.

(10) Patent No.: US 7,085,634 B2
(45) Date of Patent: Aug. 1, 2006

(54) PARKING ASSIST APPARATUS AND PARKING ASSIST METHOD FOR VEHICLE

(75) Inventors: Tomohiko Endo, Toyota (JP); Hisashi Satonaka, Susono (JP); Yuichi Kubota, Okazaki (JP); Akira Matsui, Toyota (JP); Hideyuki Iwakiri, Tajimi (JP); Toru Sugiyama, Toyota (JP); Seiji Kawakami, Susono (JP); Katsuhiko Iwazaki, Shizuoka-ken (JP); Hiroaki Kataoka, Susono (JP); Yuu Tanaka, Aichi-ken (JP); Yoshifumi Iwata, Anjo (JP)

(73) Assignees: Toyota Jidosha Kabushiki Kaisha, Toyota (JP); Aisin Seiki Kabushiki Kaisha, Kariya (JP)

( * ) Notice: Subject to any disclaimer, the term of this patent is extended or adjusted under 35 U.S.C. 154(b) by 214 days.

(21) Appl. No.: 10/810,652

(22) Filed: Mar. 29, 2004

(65) Prior Publication Data

US 2004/0260439 A1 Dec. 23, 2004

(30) Foreign Application Priority Data

Apr. 11, 2003 (JP) ............................. 2003-108323
May 22, 2003 (JP) ............................. 2003-144607

(51) Int. Cl.
*G06F 7/00* (2006.01)
*B60S 9/00* (2006.01)
(52) U.S. Cl. ........................ 701/36; 180/199; 280/761
(58) Field of Classification Search ................ 701/36, 701/41, 70, 23, 25, 28; 340/932.2, 901, 425.5, 340/436; 180/199, 6.2; 280/761; 348/148–149; 281/761

See application file for complete search history.

(56) References Cited

U.S. PATENT DOCUMENTS 6,476,730 B1 * 11/2002 Kakinami et al. ....... 340/932.2
6,483,429 B1 * 11/2002 Yasui et al. ................ 340/435

FOREIGN PATENT DOCUMENTS

JP A 11-208420 8/1999
JP A 2002-240661 8/2002

* cited by examiner

*Primary Examiner*—Yonel Beaulieu
(74) *Attorney, Agent, or Firm*—Oliff & Berridge, PLC

(57) ABSTRACT

A parking assist apparatus allows a target parking position to be set by a user moving a target parking frame displayed together with an actual image of surroundings of a vehicle, and automatically guides the vehicle to the set target parking position. In the parking assist apparatus, the target parking frame is initially displayed through the use of past setting of the target parking position by the user.

20 Claims, 11 Drawing Sheets

FIG.5

| $\theta$ | $X_C$ | $Z_C$ |
|---|---|---|
| −90〜−80 | $X_1$ | $Z_1$ |
| −80〜−70 | $X_2$ | $Z_2$ |
| −70〜−60 | $X_3$ | $Z_3$ |
| ⋮ | ⋮ | ⋮ |
| 70〜80 | $X_{17}$ | $Z_{17}$ |
| 80〜90 | $X_{18}$ | $Z_{18}$ |

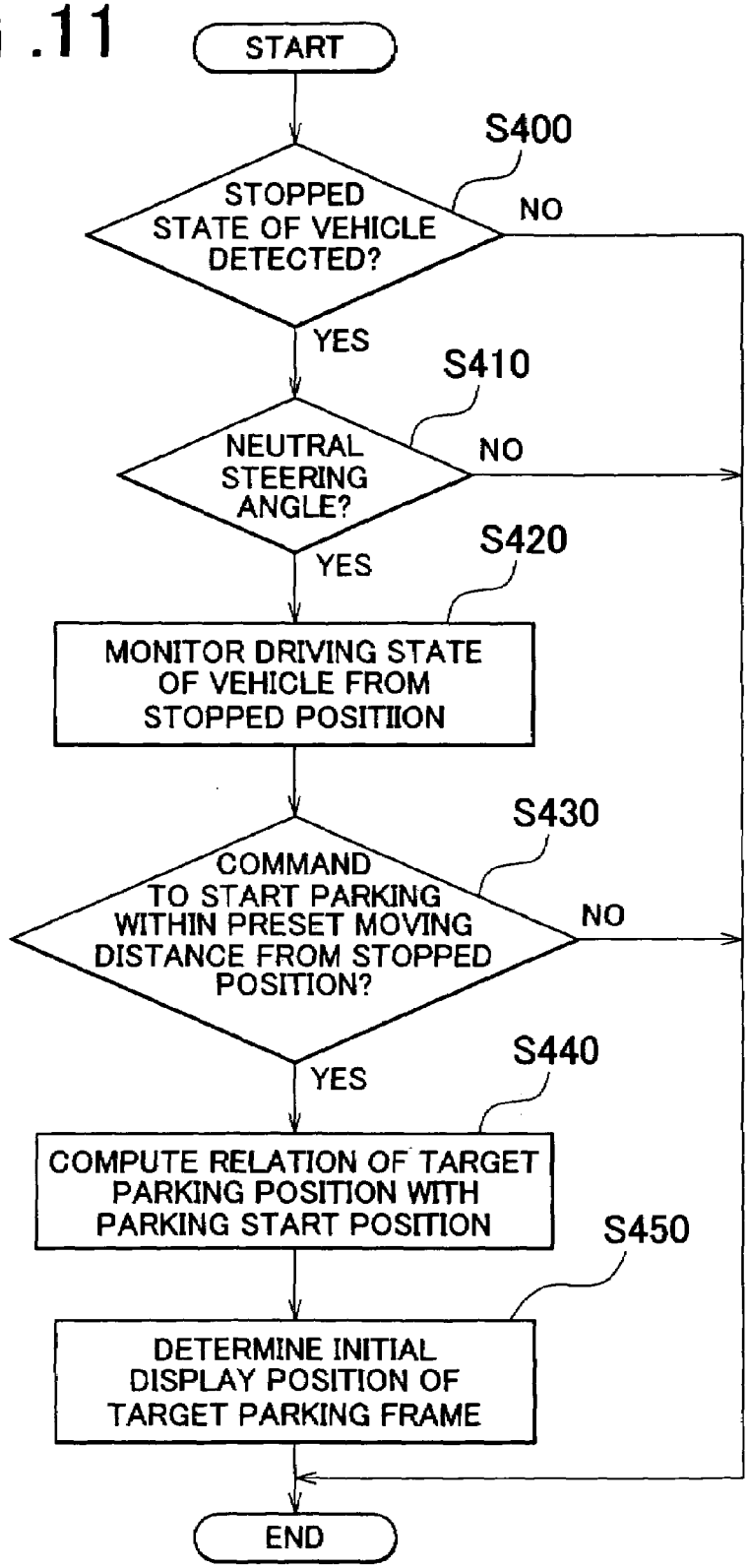

PARKING ASSIST APPARATUS AND PARKING ASSIST METHOD FOR VEHICLE

INCORPORATION BY REFERENCE

The disclosures of Japanese Patent Applications No. 2003-108323 filed on Apr. 11, 2003 and No. 2003-144607 filed on May 22, 2003, including the specifications, drawings and abstracts thereof, are incorporated herein by reference in their entireties.

BACKGROUND OF THE INVENTION

1. Field of the Invention

The invention relates to a parking assist apparatus and a parking assist method for performing a parking assist control of automatically guiding a vehicle to a target parking position.

2. Description of the Related Art

In a known parking assist apparatus as described in Japanese Patent Application Laid-Open Publication No. 11-208420 which performs a parking assist control of automatically guiding a vehicle to a target parking position, a target parking frame is displayed in a superimposed fashion on an actual image of surroundings of the vehicle displayed on a display monitor before the parking assist control starts. In this parking assist apparatus, a target parking position can be designated by a user operating an adjustment knob so as to change the position of the target parking frame on the display monitor.

To allow the user to set a target parking position, a target parking frame for designating a target parking position is displayed initially in a predetermined default position or an estimated position provided through system calculation on the display monitor. However, the target parking frame is not always initial-displayed in a parking position (including the orientation thereof) that is desirable to every user. That is, there is a certain limit of the accuracy in estimating an initial position of the target parking frame because the relationship of the parking start position to a target parking position varies depending on the driving characteristics of individual drivers. Therefore, if the initial position of the target parking frame does not correspond to the parking start position-to-target parking position relationship to which a user is accustomed, the user has to bear an inconvenience of going through the positional adjustment of the target parking frame for every operation of parking assist control.

SUMMARY OF THE INVENTION

Accordingly, it is an object of the invention to provide a parking assist apparatus and a parking assist method capable of displaying an initial display position of a target parking frame at an appropriate display position.

In accordance with a first aspect of the invention, a parking assist apparatus includes a display device that displays an actual image of surroundings of a vehicle and a target parking frame indicating a target parking position where the vehicle is to be parked, an initial display control device that initially displays the target parking frame on the display device by using a past setting of the target parking position performed by a user, and a guide device that automatically guides the vehicle to the target parking position set by the user moving the target parking frame initially displayed.

According to the first aspect of the invention, a user sets a target parking position by moving the target parking frame (e.g., a graphic form imitating the external shape of a parking space or a vehicle) displayed together with an actual image of surroundings of the vehicle to a position (including orientation) that corresponds to the actual parking space. It is desirable that the initial position of the target parking frame (including the orientation thereof) correspond to the driving characteristics of individual users (drivers) so that the need for a user to move and adjust the target parking frame displayed in the initial position is minimized. In this respect, the invention utilizes the fact that the relationship of the parking start position with the target parking position varies from one user to another, but tends to remain substantially consistent for a single user. That is, the target parking frame is initially displayed through the use of a past setting. Therefore, according to the invention, it becomes possible to initially display the target parking frame in a position (including orientation) corresponding to the driving characteristic of each user. Hence, the time needed for setting the target parking position is considerably reduced.

The initial display of the target parking frame through the use of a past setting of a target parking position may be initial display of a target parking frame in a position (including orientation) that is the same as the position of a previously or past set target parking frame. In this case, the kind of parallel parking (left or right-side parallel parking) or the deflection angle in garage parking as described below may be considered in selecting a previous or past setting which should be used for the present initial display of the target parking frame.

In the first aspect, the parking assist apparatus may further include: a control parameter computing device that computes an amount of movement of the vehicle and an amount of change in orientation of the vehicle that are needed in order to guide the vehicle from the parking start position to the set target parking position, as control parameters; a storage device that stores the computed control parameters in association with the computed amount of movement and the computed amount of change; and an estimation device that estimates the target parking position based on a driving state of the vehicle up to the parking start position, and that estimates the amount of movement and the amount of change that are needed in order to guide the vehicle from the parking start position to the estimated target parking position. In this apparatus, the initial display control device may retrieve the control parameters corresponding to the estimated amount of movement and the estimated amount of change from the storage device, and may initially display the target parking frame on the display device based on the retrieved control parameters.

In the above-described aspect of the invention, when the user's setting of a target parking position ends, the relationship of the parking start position with the target parking position (i.e., the amount of movement of the vehicle and the amount of change in the orientation of the vehicle (hereinafter, the amount of change will be referred to as "deflection angle") that are needed in order to guide the vehicle from the parking start position and the set target parking position) are computed as control parameters. The computed control parameters are based on results of the setting of the target parking position performed by the user, and are considered to correspond to the driving characteristic of the user. Therefore, the control parameters are stored for use for the initial display of the target parking frame at the next and later times of setting a target parking position. The computed control parameters are stored in association with the computed deflection angle (that is one of the control parameters). In this invention, the initial display of the target parking frame is accomplished on the basis of the control parameters stored as described above. Therefore, according to the invention, the target parking frame can be initially displayed in a position (including orientation) corresponding to a past setting of the target parking position (i.e., the control parameters computed in the past at the time of setting) by the user. Hence, it becomes possible to initially display the target parking frame in a position (including orientation) corresponding to the driving characteristic of each user. The control parameters used for the initial display of the target parking frame are retrieved from the storage means in accordance with the deflection angle estimated on the basis of the driving state of the vehicle prior to the parking start position. The positional relationship of the parking start position with the target parking position varies depending on the deflection angle. Therefore, according to the invention, an appropriate past setting of the target parking position selected in accordance with the estimated deflection angle is used to initially display the target parking frame. Hence, it becomes possible to more reliably accomplish the initial display of the target parking frame in a position (including orientation) corresponding to the user's driving characteristic.

In the above-described construction, the estimation device may constantly compute and store the change in orientation of the vehicle for every predetermined travel distance during driving the vehicle, and may estimate the amount of change based on the stored change in orientation of the vehicle. Therefore, the orientation (deflection angle) of the vehicle can be estimated regardless of when the vehicle stops at the parking start position. That is, estimation of the deflection angle can always be accomplished.

In accordance with a second aspect of the invention, a parking assist apparatus includes: an estimation device that estimates an amount of movement of a vehicle and an amount of change in orientation of the vehicle that are needed for guiding the vehicle from a parking start position to a target parking position, as control parameters, based on a driving state of the vehicle up to the parking start position, in order for a user to set the target parking position by moving a target parking frame displayed together with an actual image of surroundings of the vehicle in an garage parking assist operation; and an initial position determination device that determines an initial display position of the target parking frame based on the estimated control parameters. The estimation device constantly computes and stores the change in orientation of the vehicle for every predetermined travel distance during driving the vehicle, and estimates the control parameters based on the stored change in orientation of the vehicle.

According to the second aspect, a user sets a target parking position by moving the target parking frame displayed together with an actual image of surroundings of the vehicle to a position (including orientation) that corresponds to the actual parking space. It is desirable that the initial position of the target parking frame (including the orientation thereof) correspond to the driving characteristics of the user so that the need for the user to move and adjust the target parking frame displayed at the initial position is minimized. In this respect, according to the invention, the control parameters needed for determining the initial position of the target parking frame are estimated on the basis of the actual driving state of the vehicle up to the parking start position. Since the control parameters are estimated on the basis of the states of vehicle run that vary depending on the driving characteristics of individual users, the invention makes it possible to initially display the target parking frame in a position (including orientation) that corresponds to the driving characteristic of each user. Furthermore, in the invention, since the change in orientation of the vehicle is constantly computed and stored for every predetermined travel distance during driving the vehicle, it is possible to accomplish the estimation of control parameters (and the corresponding determination of an initial display position of the target parking frame) regardless of when the vehicle stops at the parking start position.

In accordance with a third aspect of the invention, a parking assist method includes a first step of initially displaying a target parking frame in a screen of a display device displaying an actual image of surroundings of a vehicle by using a past setting of a target parking position performed by a user, and a second step of automatically guiding the vehicle to the target parking position set by the user moving the target parking frame displayed together with the actual image of surroundings of the vehicle.

In accordance with a fourth aspect of the invention, parking assist method includes a first step of constantly computing and storing the change in orientation of the vehicle for every predetermined travel distance during driving a vehicle, and a second step of estimating an amount of movement of the vehicle and an amount of change in orientation of the vehicle that are needed for guiding the vehicle from a parking start position to a target parking position, as control parameters, based on a driving state of the vehicle obtained before the vehicle reaches the parking start position, which includes the stored change in orientation of the vehicle, and a third step of determining an initial display position of the target parking frame based on the estimated control parameters, and a fourth step of displaying a target parking frame to the determined initial display position together with an actual image of surroundings of the vehicle, and a fifth step of setting a position of the target parking frame which is moved by the user, as the target parking position, and a sixth step of guiding the vehicle to the target parking position in the garage parking operation.

In accordance with a fifth aspect of the invention, a parking assist apparatus includes a detection device that detects a stopped state of a vehicle, and a recognition device that, if the stopped state of the vehicle is detected by the detection device, recognizes a position having a predetermined relationship with a stopped position of the vehicle occurring when the stopped state is detected, as a target parking position.

According to the fifth aspect of the invention, if the stopped state of the vehicle is detected via, for example, a vehicle speed sensor, a position having a predetermined relationship with the stopped position of the vehicle occurring at the time of detection of the stopped state is recognized as a target parking position by the parking assist apparatus. Therefore, when parking the vehicle, the user can cause the parking assist apparatus to recognize a desired target parking position merely by temporarily stopping the vehicle so that the stopped position has a predetermined relationship with the desired target parking position. The recognition of a target parking position by the parking assist apparatus may be performed every time the stopped state of the vehicle is detected.

In the fifth aspect of the invention, the parking assist apparatus may further include a display device that displays the recognized target parking position together with an actual image of surroundings of the vehicle. Therefore, it becomes possible to indicate the recognized target parking position to the user when the parking operation starts. In this case, the display of the target parking position may be carried out when the vehicle reaches the parking start position.

In the above-described construction, the parking assist apparatus may further include a manual operation device that moves and adjusts a display position of the target parking position in accordance with a switch operation. Therefore, the target parking position recognized by the parking assist apparatus as described above can be changed or adjusted in the display screen by the user. In this case, final determination of a target parking position is left for the user to accomplish.

In the fifth aspect of the invention, if a steering angle being substantially at a neutral position is detected in addition to the stopped state of the vehicle, the recognition device may recognize, as the target parking position, a position having a predetermined relationship with the stopped position of the vehicle. This arrangement reduces the frequency of recognition of a target parking position by the parking assist apparatus being triggered by the detection of a normal stopped state of the vehicle other than the stopped state that is intended to cause the parking assist apparatus to recognize a target parking position. At the time of garage parking in particular, the steering wheel is held in a turned state until the parking start position is reached. Therefore, if the user stops the vehicle after making a stop for causing the parking assist apparatus to recognize a desired target parking position for garage parking, the parking assist apparatus does not recognize a target parking position with reference to the later stopped position.

In the fifth aspect of the invention or constructions related thereto, the recognition device may recognize the position having the predetermined relationship with the first stopped position as at least one candidate for the target parking position, and may recognize a candidate among the at least one candidate which is recognized with reference to a second stopped position having a predetermined relationship with a present vehicle position that is apart from the first stopped position, as the target parking position. Therefore, among a plurality of target parking position candidates, an appropriate candidate can be recognized as an actual target parking position. Hence, the accuracy in estimating a target parking position improves. The parking assist apparatus may retain target parking position candidates in storage until the vehicle reaches a parking start position. In this case, it is possible to delete, at appropriate timing, each candidate that becomes unnecessary as it loses the predetermined relationship with the present vehicle position due to movement of the vehicle. The aforementioned predetermined positional relationship between the present vehicle position and the stopped position may be specified by the linear distance between the two positions or the moving or travel distance of the vehicle between the two positions, and may also be specified as a range defined by an upper limit value and a lower limit value of either the linear distance or the travel distance.

In the fifth aspect of the invention or its related constructions, if a plurality of candidates exist, the recognition device may recognize, among the plurality of candidates, a candidate recognized with reference to a second stopped position that is nearest to the present vehicle position that is apart from the first stopped position, as the target parking position. Therefore, among a plurality of target parking position candidates, only one appropriate candidate can be selected as a target parking position.

In the fifth aspect of the invention or its related constructions, if the candidate does not exist, the recognition device may recognize a preset position to which the vehicle is guidable with reference to the present vehicle position that is apart from the stopped position, as the target parking position.

In accordance with a sixth aspect of the invention, parking assist method includes a first step of detecting a stopped state of a vehicle, and a second step of recognizing, as a target parking position, a position having a predetermined relationship with a stopped position of the vehicle occurring when the stopped state of the vehicle is detected in the first step.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 5 illustrates the control parameters stored and managed in accordance with the deflection angle $\theta$;

FIG. 11 is a flowchart illustrating a specific process routine executed by the parking assist ECU of the second embodiment.

DETAILED DESCRIPTION OF THE PREFERRED EMBODIMENTS

Preferred embodiments of the invention will be described hereinafter with reference to the accompanying drawings.

Figure 1:
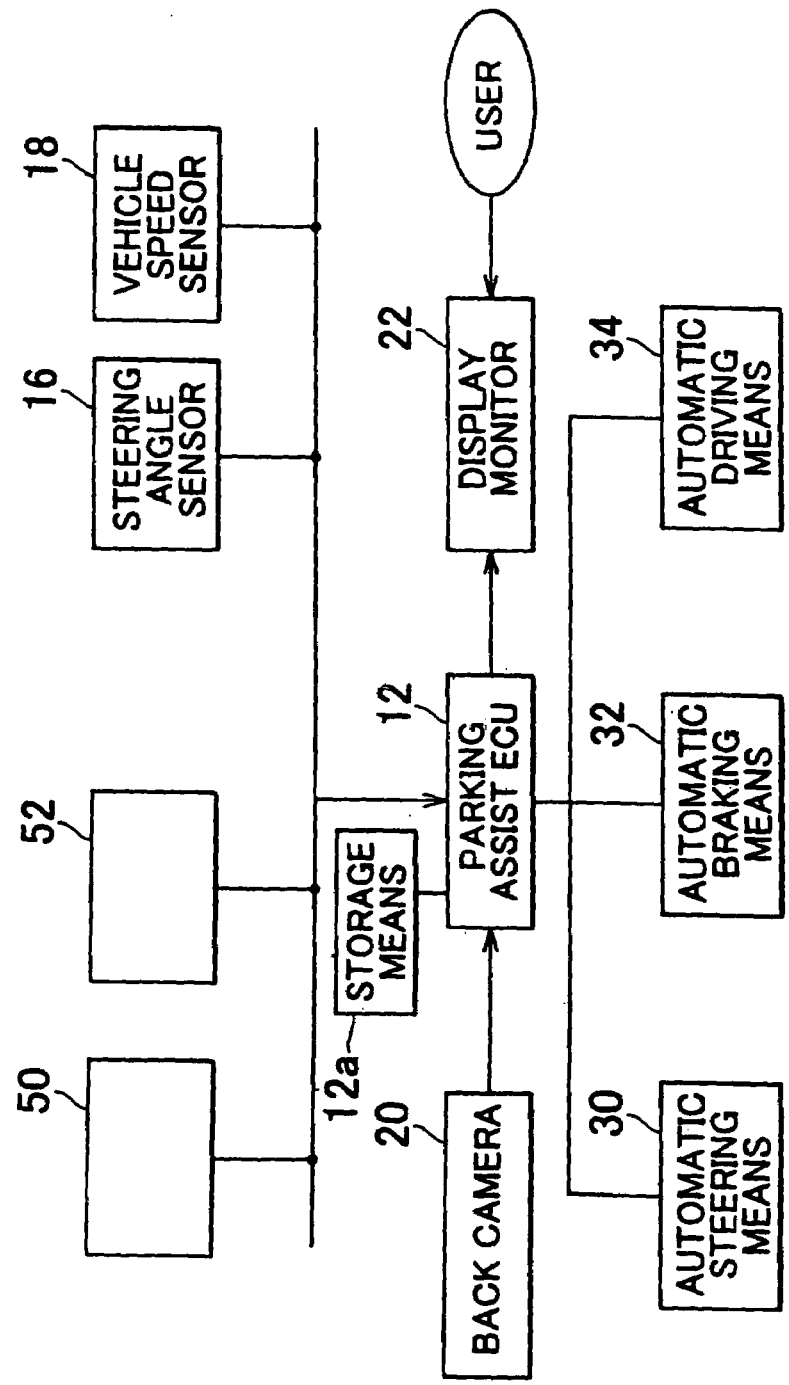
FIG. 1 is a diagram illustrating the system construction of first and second embodiments of the parking assist apparatus of the invention.

FIG. 1 is a diagram illustrating the system construction of a first embodiment of the parking assist apparatus of the invention. This system construction diagram also applies to second and third embodiments of the invention. In the third embodiment, however, storage means 12a may be omitted. As shown in FIG. 1, the parking assist apparatus has an electronic control unit 12 (hereinafter, referred to as "parking assist ECU 12") as a central component. The parking assist ECU 12 is formed as a microcomputer that includes a CPU, a ROM, a RAM, etc. that are connected to one another via a bus (not shown). The ROM stores programs (including the programs corresponding to arithmetic expressions mentioned below), and predetermined characteristic values of the vehicle (for example, a wheel base L (not shown), an overall gear ratio ρ, etc.).

A steering angle sensor 16 that detects the steering angle Ha (not shown) of a steering wheel (not shown), and a vehicle speed sensor 18 that detects the speed V (not shown) of the vehicle, are connected to the parking assist ECU 12 via an appropriate bus such as a high-speed communication bus or the like. The vehicle speed sensor 18 may be tire wheel speed sensors that are provided on tire wheels and output pulse signals at frequencies corresponding to the tire wheel speeds. The output signals of the steering angle sensor 16 and the vehicle speed sensor 18 are supplied to the parking assist ECU 12. Furthermore, automatic steering means 30, automatic braking means 32, and automatic driving means 34 are connected to the parking assist ECU 12 via an appropriate bus.

Still further, a reverse shift switch 50 and a parking switch 52 are connected to the parking assist ECU 12. The reverse shift switch 50 outputs an on-signal when a shift lever is operated to the reverse position. In the other cases, the reverse shift switch 50 is kept in an off-state. The parking switch 52 is provided in a cabin so that the parking switch 52 can be operated by a user. The parking switch 52 is normally kept in an off-state, and becomes an on-state when operated by a user. The parking assist ECU 12 determines whether the present situation is a situation in which the vehicle is to be backed on the basis of the output signal of the reverse shift switch 50, and also determines whether a user needs parking assist on the basis of the output signal of the parking switch 52.

A back monitor camera 20 disposed in a central portion of a rear bumper of the vehicle, and a display monitor 22 disposed in the cabin are connected to the parking assist ECU 12. The back monitor camera 20 is a CCD camera for taking images of scenes in a region of a predetermined angle behind the vehicle. The image signals acquired by the camera 20 are supplied to the parking assist ECU 12. The parking assist ECU 12 displays an image shot by the back monitor camera 20 on the display monitor 22 when both the reverse shift switch 50 and the parking switch 52 are in the on-state. At that time, the display monitor 22 displays touch switches for setting a target parking position and also displays a target parking frame in a superimposed fashion on the actually shot image, as shown in FIG. 2 (showing a screen for garage parking).

Figure 2:
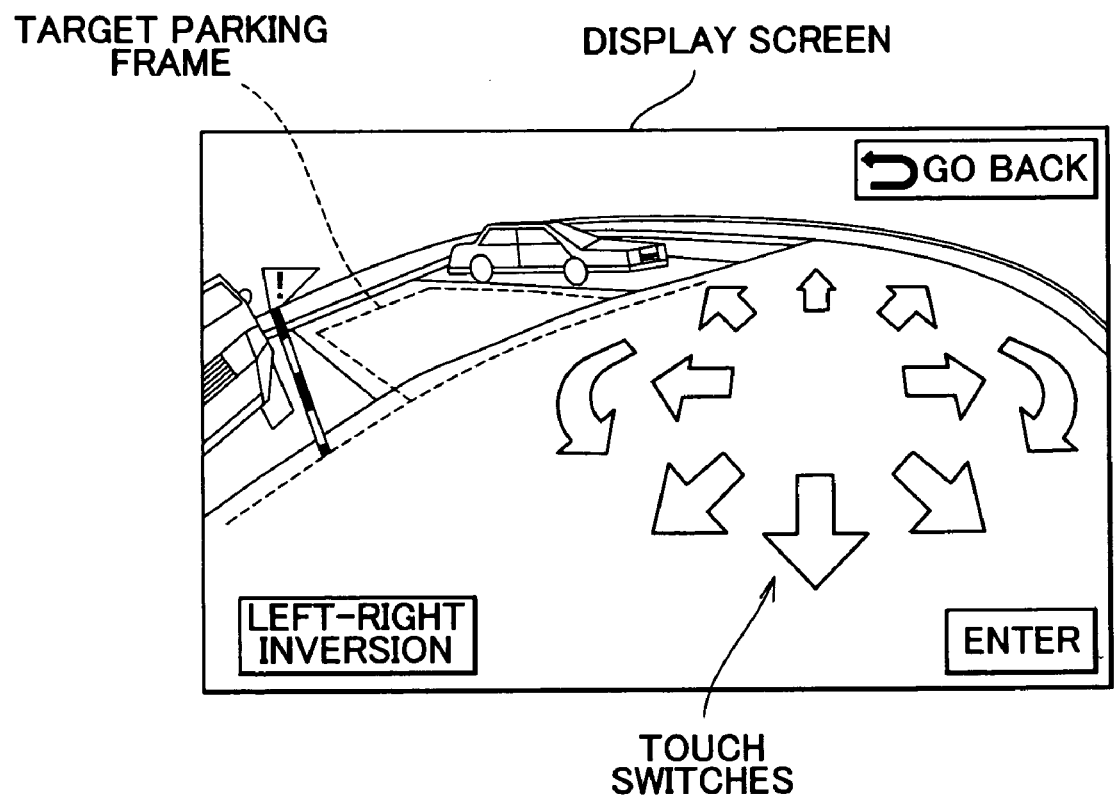
FIG. 2 is a diagram showing a form of the touch panel for setting a target parking position on a display monitor 22.

The target parking position-setting touch switches may include, for example, touch switches for translationally moving the target parking frame upward, downward, rightward and leftward and rotating the target parking frame, a left-right inversion switch for inverting the target parking frame about the longitudinal axis of the vehicle (corresponding to a center axis of the screen), a parking select switch (not shown) for designating a kind of parking to be executed, and an enter switch for determining the position of the target parking frame (including the orientation thereof) as shown in FIG. 2. These touch switches are displayed on the display monitor 22 in appropriate stages in accordance with their purposes.

Figure 3:
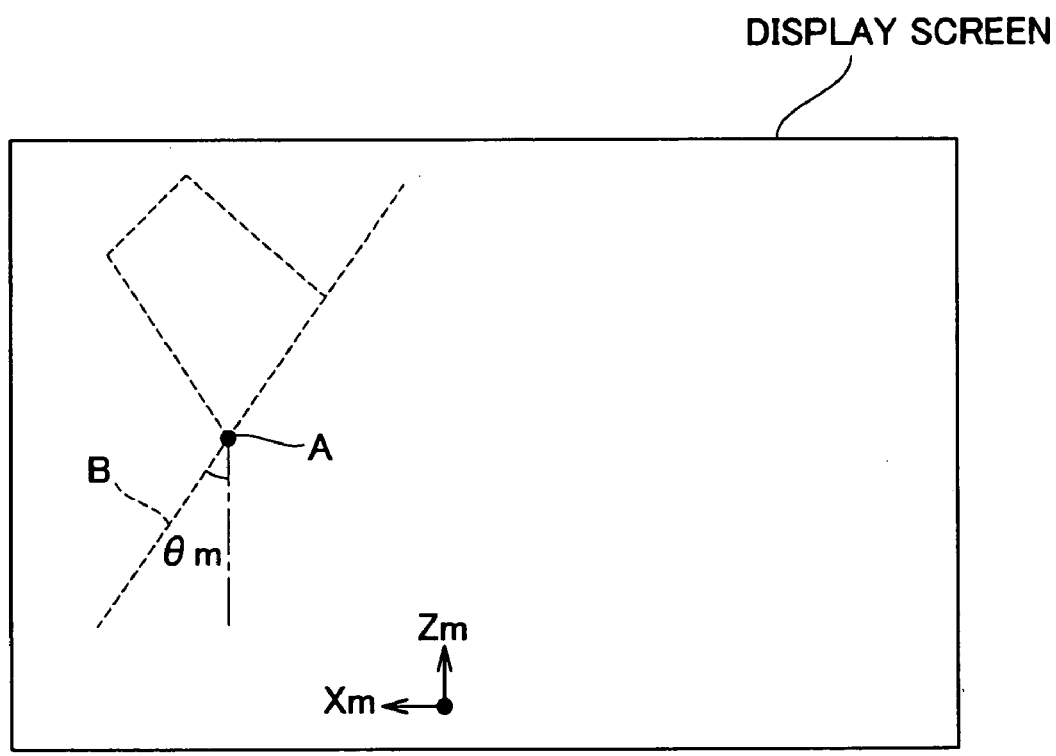
FIG. 3 illustrates a target parking frame displayed in a superimposed fashion on a camera-taken image.

The target parking frame may have a shape imitating an actual parking space, an external shape of the vehicle, etc., as indicated by a broken line in FIG. 3. Furthermore, the target parking frame may have a configuration that allows a user to visually recognize the position and orientation thereof, and may be provided in two kinds for the garage parking-purpose display and the parallel parking-purpose display. The coordinate values of the target parking frame on the display monitor 22 are managed in a coordinate system that expresses the position and orientation of the target parking frame. Specifically, the position of the target parking frame on the display monitor 22 is expressed in a two-dimensional coordinate system on the display monitor 22 with an axis on the display monitor 22 corresponding to the axis (longitudinal axis) of the vehicle being defined as a $Z_m$ axis, and with the axis perpendicular to the $Z_m$ axis being defined as an $X_m$ axis, for example, as the position coordinate ($X_m$, $Z_m$) of a reference point A on the target parking position. The orientation of the target parking frame on the display monitor 22 is managed by the gradient $\theta_m$ of a reference line B of the target parking frame with respect to the $Z_m$ axis. In the case of parallel parking, since the angle of the vehicle to be achieved is known (i.e., zero), the orientation of the target parking frame for parallel parking may be unchangeable by a user (i.e., $\theta_m$ is a fixed value whose positive-negative sign changes depending on the sign of the coordinate value $X_m$). Hereinafter, the ($X_m$, $Z_m$, $\theta_m$) that prescribes the position and orientation of the target parking frame on the display monitor 22 will be referred to as "display parameters".

The user performs a setting operation of conforming the target parking frame to an actual parking space in the display monitor 22 by moving the target parking frame in the display monitor 22, that is, changing the position of the target parking frame (i.e., changing each value of the display parameters ($X_m$, $Z_m$, $\theta_m$)), through the use of target parking position-setting touch switches (adjusting switches). That is, the user rotates and translationally moves the target parking frame upward, downward, leftward or rightward in the display monitor 22 through the use of touch switches so as to change the position of the target parking frame (including the orientation of the target parking frame in the case of garage parking) to the position of the actual parking space (including the orientation thereof). The target parking frame, after being adjusted in position (including orientation) in this manner, is determined as a final target parking frame by a user, for example, depressing the enter switch (i.e., the setting of a target parking position by the user is completed).

After a final position of the target parking frame (including the orientation thereof) is determined by the user (i.e., the values of the display parameters ($X_m$, $Z_m$, $\theta_m$) are determined) in the above-described fashion, the parking assist ECU 12 computes a relationship of the parking start position to the target parking position, that is, the amount of movement ($X_c$, $Z_c$) of the vehicle to be moved from the parking start position to the target parking position and the angle θ of the vehicle to be turned from the parking start position to the target parking position (hereinafter, ($X_c$, $Z_c$, θ) will be referred to as "control parameters"). The control parameters ($X_c$, $Z_c$, θ) are defined by an actual two-dimensional coordinate system in which the origin is defined at the center of the rear axle of the vehicle and the X axis extends in the vehicular transverse direction and the Z axis extends in the vehicular longitudinal direction. The values of the control parameters ($X_c$, $Z_c$, θ) correspond on a one-to-one basis to the values of the display parameters ($X_m$, $Z_m$, $\theta_m$). Therefore, if the values of the display parameters ($X_m$, $Z_m$, $\theta_m$) are determined, the values of the control parameters ($X_c$, $Z_c$, θ) can be computed through a predetermined conversion formula. The computation in the reverse direction is also possible. The conversion formula can be determined beforehand by taking into account the mounting position of the back monitor camera 20, the lens characteristics of a wideangle lens of the back monitor camera 20, etc. In the case of parallel parking, the computation of the control parameter θ is unnecessary since the angle of the vehicle to be turned is known (i.e., zero).

After the control parameters ($X_c$, $Z_c$, θ) for the target parking position are determined in this fashion, the parking assist ECU 12 calculates a target path along which the vehicle is to be guided from the present position of the vehicle to the target parking position, and target steer angles of tires to be steered at various positions on the target path. It is to be noted herein that the position of the target parking frame always one-to-one corresponds to the target parking position.

Thus, the user needs only to set a target parking position on the display monitor 22 in order for the parking assist apparatus to automatically guide the vehicle to the target parking position.

Figure 9:
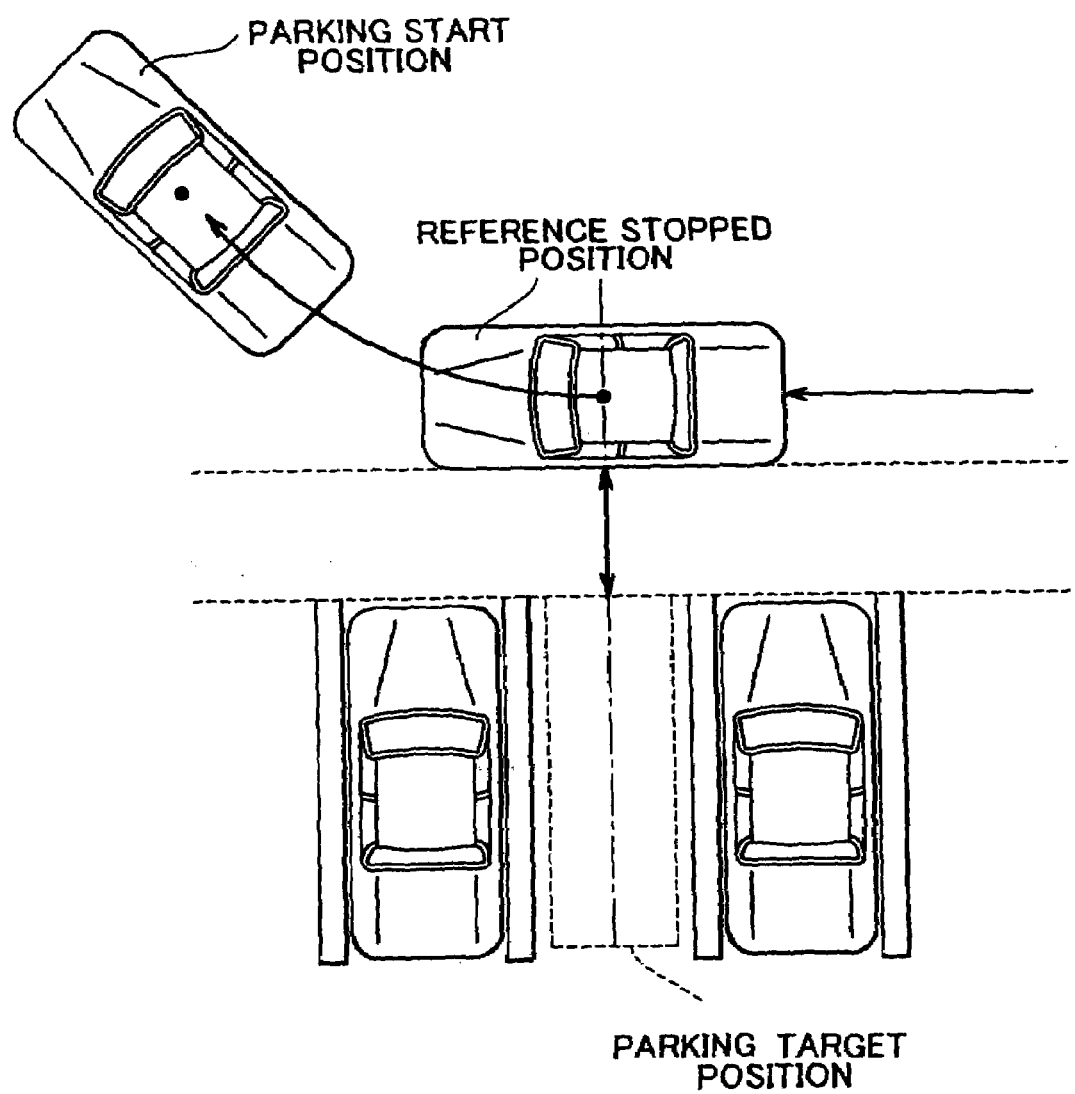
FIG. 9 illustrates a method of estimating a target parking position for garage parking in accordance with the invention.

In the above-described parking assist control, the target parking frame is initially displayed on the display monitor 22 when the vehicle reaches a parking start position (see FIG. 9). The target parking frame is moved for positional adjustment in accordance with the need so as to designate a target parking position. Therefore, if the target parking frame is initially displayed in a position corresponding to a desired target parking position, the need for positional adjustment of the target parking frame reduces or becomes null, so that the total time needed for automatic parking can be reduced.

Therefore, in the first to third embodiments, processes of parking assist control are executed as described below. The first embodiment will first be described.

In the first embodiment, when the control parameters ($X_c$, $Z_c$, θ) are determined, the parking assist ECU 12 stores the control parameters ($X_c$, $Z_c$, θ) into the predetermined rewritable storage means 12a (e.g., the RAM of the parking assist ECU 12). At this time, the control parameters ($X_c$, $Z_c$, θ) are stored and managed separately for garage parking and parallel parking.

Figure 4A:
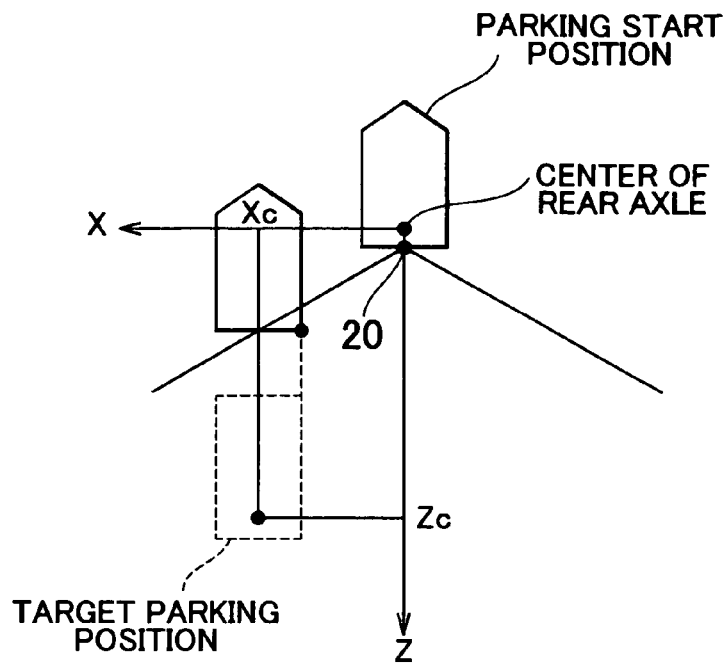
FIG. 4A illustrates control parameters in the case of parallel parking.
Figure 4B:
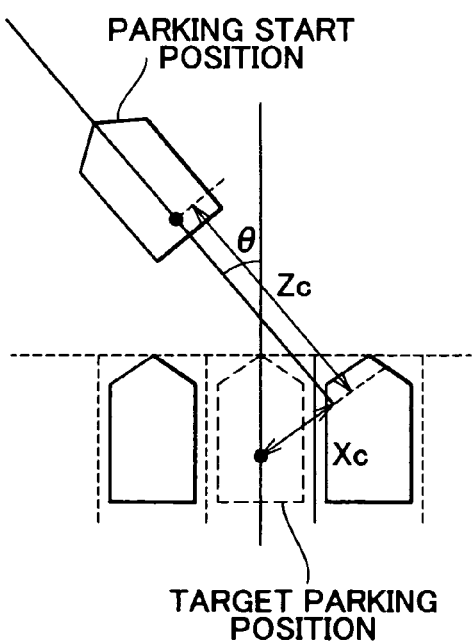
FIG. 4B illustrates control parameters in the case of garage parking.

Specifically, in the case of garage parking, values of the control parameters ($X_c$, $Z_c$) are classified in storage in accordance with the angle θ of the vehicle to be angled to the target parking position (hereinafter, this control parameter will be referred to as "deflection angle θ") as shown in FIG. 5. In this embodiment, ranges of the deflection angle θ are set for every 10 degrees in the positive and negative directions from 0 degree. The sign of the deflection angle θ in FIG. 5 is defined so that a leftward deflection of the vehicle as in FIG. 4B (i.e., a counterclockwise deflection from a vehicular longitudinal axis). Therefore, 18 sets of control parameters ($X_c$, $Z_c$) are stored corresponding to the ranges of the deflection angle θ (i.e., ($X_{c1}$, $Z_{c1}$) to ($X_{c18}$, $Z_{c18}$)). The control parameters ($X_c$, $Z_c$) are managed separately for the positive and negative signs of the deflection angle θ because general vehicle movement characteristics that are inverted in phase by a left-right inversion of the relationship of a parking start position to a target parking position in garage parking are taken into consideration.

In the case of parallel parking, since the deflection angle θ is zero, the control parameters ($X_c$, $Z_c$) in storage are sorted in accordance with the positive and negative signs of the control parameter $X_c$ (the positive sign applies to the left side of the axis of the vehicle). That is, in the storage means 12a of this embodiment, only two sets of control parameters ($X_c$, $Z_c$) with $X_c$ varying in sign (i.e., ($X_{c1}$, $Z_{c1}$) and ($X_{c2}$, $Z_{c2}$) where $X_{c1}$, $X_{c2}$, <0) are stored. The control parameters ($X_c$, $Z_c$) are managed separately for the positive and negative signs of $X_c$ for a reason as stated above, that is, because general vehicle movement characteristics that are inverted in phase by a left-right inversion of the relationship of a parking start position with a target parking position in parallel parking are taken into consideration.

Therefore, every time the position of the target parking frame is determined (entered) on the display monitor 22 (i.e., every time the user's setting of a target parking position is completed), the parking assist ECU 12 computes the control parameters ($X_c$, $Z_c$, θ), and updates and stores the control parameters ($X_c$, $Z_c$) in accordance with the value of the deflection angle θ in the case of garage parking, and updates and stores the control parameters ($X_c$, $Z_c$) in accordance with the sign of $X_c$ in the case of parallel parking. The updated control parameters ($X_c$, $Z_c$) (or control parameters ($X_c$, $Z_c$, θ)) stored in the storage means 12a are used to determine an initial position of the target parking frame at the next and following times of setting a target parking position, as described in detail below with reference to FIG. 6. Incidentally, the "initial position of the target parking frame" refers to the "position (including the orientation) of the target parking frame" that is initially displayed on the display monitor 22 when a user is to set a target parking position on the display monitor 22.

Figure 6:
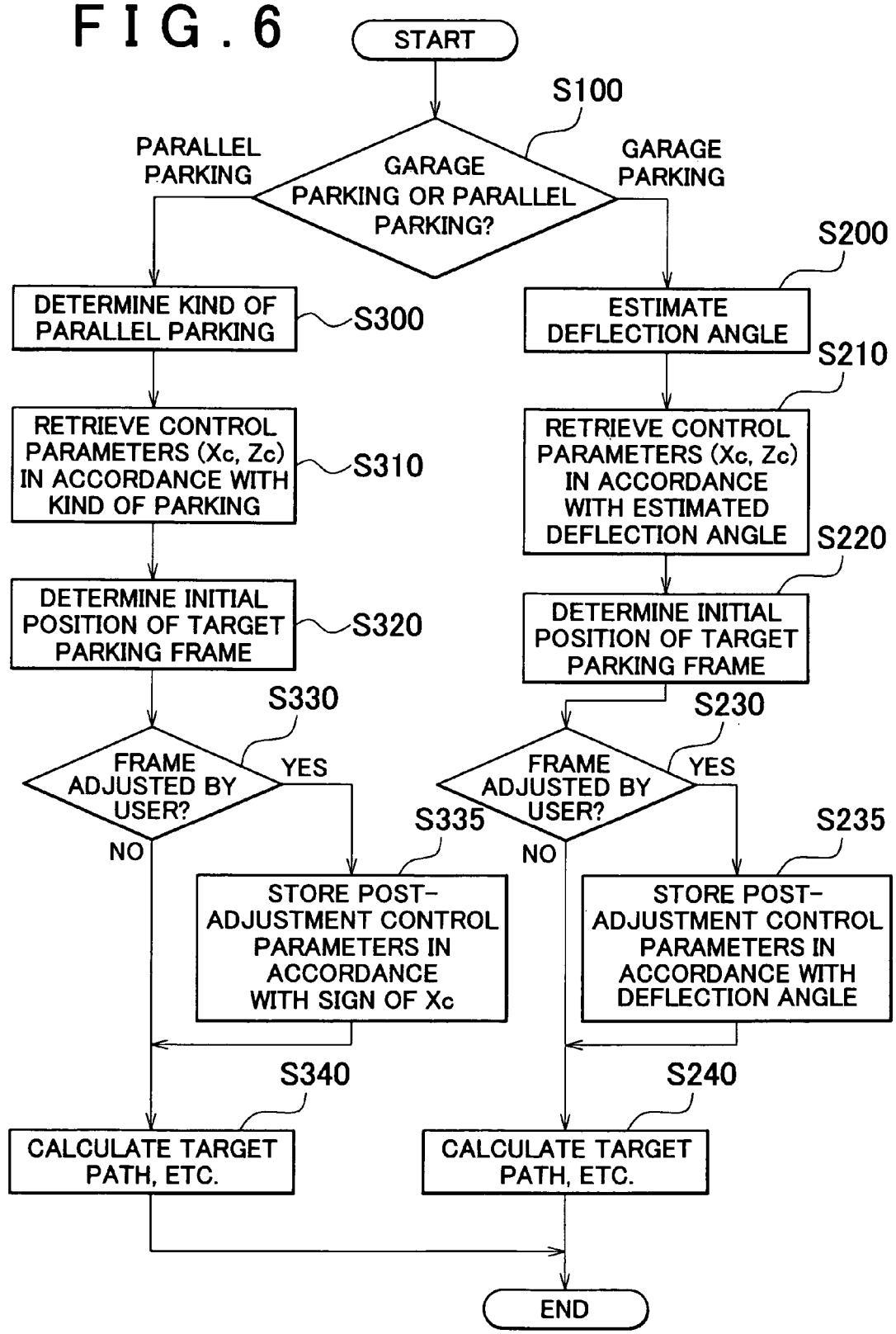
FIG. 6 is a flowchart of a process routine executed as a pre-process for parking assist control by a parking assist ECU of the first embodiment.

FIG. 6 is a flowchart illustrating a process routine that the parking assist ECU 12 of this embodiment execute as a pre-process for the parking assist control so as to properly determine an initial position of the target parking frame. This routine is activated when the reverse shift switch 50 and the parking switch 52 are both operated to the on-state after the vehicle has become a stopped state.

In step 100, a process of displaying the parking select switch on the display monitor 22 is executed in order to prompt a user to select which one of garage parking and parallel parking is to be performed. If garage parking is selected, the process starting at step 200 is executed. If parallel parking is selected, the process starting at step 300 is executed.

In step 200, the deflection angle θ of the vehicle to be inclined with respect to the target parking position is estimated on the basis of the driving state of the vehicle up to the parking start position. This process will be described in detail below. In the description below, the deflection angle estimated on the basis of the driving state will be presented as deflection angle $θ_{est}$ with subscripts if the deflection angle needs to be distinguished from the deflection angles θ of the other concepts.

Subsequently in step 210, the control parameters ($X_c$, $Z_c$) corresponding to the deflection angle $θ_{est}$ estimated in step 200 are retrieved from the storage means 12a. At this time, the parking assist ECU 12 uses a map as shown in FIG. 5 to identify the range of deflection angle θ that contains the estimated deflection angle $θ_{est}$ and to extract the control parameters ($X_c$, $Z_c$) corresponding to the range of deflection angle θ from the storage means 12a.

Subsequently in step 220, the display parameters ($X_m$, $Z_m$, $θ_m$) corresponding to the control parameters ($X_c$, $Z_c$, $θ_{est}$) derived in step 210 are computed. Furthermore, the target parking frame for garage parking is displayed on the display monitor 22 in the position and orientation based on the computed display parameters ($X_m$, $Z_m$, $θ_m$). That is, in step 220, an initial position of the target parking frame for garage parking is determined. In step 220, a process of displaying a left-right inversion switch having the function of left-right inverting the target parking frame may be further executed.

Subsequently in step 230, it is determined whether the initial position of the target parking frame is adjusted by a user before the enter switch is pressed by the user. If the adjustment of the initial position of the target parking frame is executed by the user, the process proceeds to step 235. In step 235, the post-adjustment/determination display parameters are computed, and the control parameters ($X_c$, $Z_c$, $\theta'$) corresponding to the computed display parameters ($X_m'$, $Z_m'$, $\theta_m'$) are newly computed in the above-described fashion. In accordance with the computed deflection angle $\theta'$, the computed control parameters ($X_c$, $Z_c$) are stored in an updating fashion in storage means 12a. Then, the process proceeds to step 240. Conversely, if the adjustment of the initial position of the target parking frame is not executed but the enter switch is pressed by the user, it can be determined that the initial position of the target parking frame meets the user's intention. Therefore, the updating-storing process is not executed, but the process immediately proceeds to step 240.

Alternatively, it is possible to determine in step 230 whether the number of adjusting operations performed on the target parking frame by the user (i.e., the number of touch switch operations) or the amount of movement of the target parking frame caused thereby before the entry switch is depressed is greater than a corresponding one of predetermined threshold values. In this case, if the number of adjusting operations performed by the user is about 4 or 5, it can be determined that the initial position of the target parking frame roughly meets the intention of the user to a certain degree. Therefore, the update-storage of the initial position of the target parking frame is not executed, and the process proceeds to step 240.

In step 230, if the left-right inversion switch displayed on the display monitor 22 in step 220 is operated, the parking assist ECU 12 retrieves the control parameters ($X_c$, $Z_c$) corresponding to the deflection angle $\theta_{est}''$ that is different only in sign from the deflection angle $\theta_{est}$ estimated in step 200, and newly displays the target parking frame on the display monitor 22 in the position and orientation corresponding to the control parameters ($X_c$, $Z_c$, $\theta_{est}''$) After that, if the target parking frame displayed in the left-right inverted fashion is adjusted by the user, the process proceeds to step 235 as described above. In step 235, the control parameters ($X_c$, $Z_c$, $\theta'$) corresponding to the post-adjustment/determination display parameters ($X_m'$, $Z_m'$, $\theta_m'$) are newly computed in the above-described fashion. The computed control parameters ($X_c$, $Z_c$) are stored in an updating fashion in storage means 12a in accordance with the computed deflection angle $\theta'$. Then, the process proceeds to step 240.

Subsequently in step 240, on the basis of the control parameters ($X_c$, $Z_c$, $\theta'$) computed in step 230, a target path along which the vehicle is to be guided from the present position of the vehicle (i.e., the parking start position) to the target parking position is calculated, and target steer angles of tire wheels to be turned at various positions on the target path are calculated. Then, this process routine as a pre-process for the parking assist control ends. The calculation of a target path by the parking assist ECU 12 may be performed before the position of the target parking frame (including the orientation thereof) is determined, that is, every time the position of the target parking frame is changed by a user. In that case, if the parking assist ECU 12 determines that the calculation of a target path is impossible, the ECU 12 may cancel the display of the enter switch, and may display on the display monitor 22, for example, a message of "Guiding is impossible."

If parallel parking is selected in step 100, it is determined in step 300 what kind of parallel parking is to be performed, that is, whether the user intends to parallel-park the vehicle to the left side or the right side. This determination may be realized by providing the aforementioned parking select switch with the function of selecting the kinds of parallel parking. It is also possible to make a presumptive determination that the kind of parallel parking is the same as the previously executed kind of parallel parking.

Subsequently in step 310, the control parameters ($X_c$, $Z_c$) are retrieved from the storage means 12a in accordance with the kind of parallel parking determined in step 300. For example, if it is determined in step 300 that the left-side parallel parking is intended, the control parameters ($X_c$, $Z_c$) with the sign of $X_c$ being positive are retrieved from the storage means 12a.

Subsequently in step 320, the display parameters ($X_m$, $Z_m$, $\theta_m$) corresponding to the control parameters ($X_c$, $Z_c$) retrieved in step 310 (where $\theta_m$ is a predetermined fixed value that varies in sign in accordance with the sign of $Z_c$) are computed, and the target parking frame is displayed on the display monitor 22 in the position based on the computed display parameters ($X_m$, $Z_m$). That is, in step 320, the initial position of the target parking frame for parallel parking is determined. Furthermore in step 320, the left-right inversion switch having the function of left-right inverting the target parking frame may be displayed.

Subsequently in step 330, it is determined whether the initial position of the target parking frame is adjusted by a user before the enter switch is pressed by the user. If the adjustment of the initial position of the target parking frame is executed by the user, the process proceeds to step 335. In step 335, the control parameters ($X_c$, $Z_c$) corresponding to the post-adjustment/determination display parameters ($X_m'$, $Z_m'$) are newly computed in the above-described fashion. In accordance with the sign of $X_c$ (i.e., the kind of parallel parking), the computed control parameters ($X_c$, $Z_c$) are stored in an updating fashion in storage means 12a. Then, the process proceeds to step 340. Conversely, if, without the user's adjustment of the initial position of the target parking frame, the enter switch is pressed by the user, it can be determined that the initial position of the target parking frame meets the user's intention. Therefore, the updating-storing process is not executed, but the process immediately proceeds to step 340.

Alternatively, it is possible to determine in step 330 whether the number of adjusting operations performed on the target parking frame by the user (i.e., the number of touch switch operations) or the amount of movement of the target parking frame caused thereby before the entry switch is depressed is greater than a corresponding one of predetermined threshold values.

In step 330, if the left-right inversion switch displayed on the display monitor 22 in step 320 is operated, the parking assist ECU 12 retrieves the control parameters ($X_c$, $Z_c$) corresponding to the kind of parallel parking that is different from the kind of parallel parking determined in step 300, and newly displays the target parking frame on the display monitor 22 in the position and orientation corresponding to the control parameters ($X_c$, $Z_c$). After that, if the target parking frame displayed in the left-right inverted fashion is adjusted by the user, the process proceeds to step 335 as described above. In step 335, the control parameters ($X_c$, $Z_c$) corresponding to the post-adjustment/determination display parameters ($X_m'$, $Z_m'$) are newly computed in the above-described fashion. The computed control parameters ($X_c$, $Z_c$) are stored in an updating fashion in storage means 12a in accordance with the sign of $X_c$. Then, the process proceeds to step 240.

Subsequently in step 340, on the basis of the control parameters ($X_c$, $Z_c$) computed in step 330, a target path along which the vehicle is to be guided from the present position of the vehicle (i.e., the parking start position) to the target parking position is calculated, and target steer angles of the tire wheels to be turned at various positions on the target path are calculated. Then, this process routine as a pre-process for the parking assist control ends.

If the pre-process for the parking assist control ends, the parking assist ECU 12 starts to execute the parking assist control. An automatic steering means, an automatic braking means and an automatic driving means are connected to the parking assist ECU 12 via an appropriate bus such as a high-speed communication bus or the like. That is, the parking assist ECU 12 controls the automatic steering means 30, the automatic braking means 32 and the automatic driving means 34 so that the vehicle will be guided along the target path into the target parking frame. Specifically, the driver eases the depression of the brake pedal to cause creeping and thereby causes the vehicle to start backing. Then, the parking assist ECU 12, using the automatic steering means 30, automatically steers the tire wheels to a target steer angle at various vehicle positions on the target path to the target parking position. Then, when the vehicle finally reaches the target parking position, the driver is requested to stop the vehicle (or the automatic braking means 32 is used to automatically stop the vehicle), so that the parking assist control is completed.

In this embodiment, a result of the setting of the target parking frame is stored in an updating fashion in accordance with the deflection angle θ in the case of garage parking as described above. In the case of parallel parking, a result of the setting of the target parking frame is stored in an updating fashion in accordance with the kind of parallel parking (left-side or right-side parallel parking). Therefore, it becomes possible to determine an initial position of the target parking frame that reflects the driving characteristics of the driver more precisely. As a result, the time needed for setting the target parking position can be considerably reduced.

Although in this embodiment, control parameters are stored and managed for every ten degrees of the deflection angle θ, further fragmentation of the deflection angle is possible. It is also possible to store and manage the control parameters in accordance with the positive or negative sign of the deflection angle θ, as in the case of parallel parking. In the latter case, the storage means 12a stores two sets of control parameters in accordance with the positive or negative control parameters.

Next, an estimation method of the deflection angle θ is executed in step 20. It is to be noted herein that the deflection angle θ is defined as an angle between the orientation of the vehicle (longitudinal axis thereof) at the target parking position and the orientation of the vehicle (longitudinal axis thereof) at the parking start position. In this embodiment, the deflection angle θ is estimated on the basis of the change in the orientation of the vehicle (hereinafter, referred to as "swing angle α") that is involved in the movement from a predetermined position to the parking start position.

Figure 7:
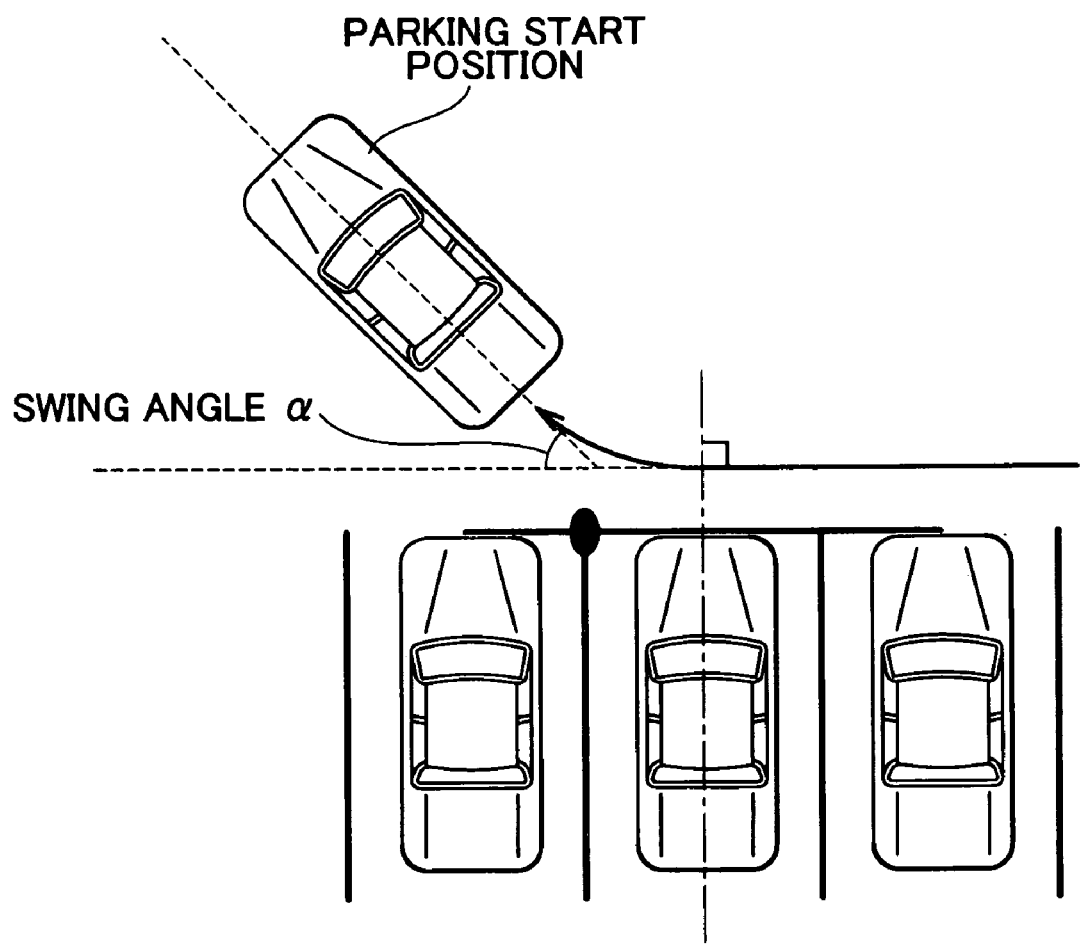
FIG. 7 illustrates a method of estimating a path of the vehicle to a parking start position and the deflection angle $\theta$ (and the swing angle $\alpha$) of the vehicle in accordance with the first embodiment.

FIG. 7 is a diagram illustrating a method of estimating the deflection angle θ in the embodiment. To perform an garage parking operation as indicated in FIG. 7, it is normally considered that the vehicle is driven substantially straight to a vicinity of the target parking position, and then is turned into such a direction as to move away from the target parking position, and is moved to the parking start position. If the vehicle has been pulled straight perpendicularly to the target parking position (space) as indicated in FIG. 7, the deflection angle θ can be computed as [deflection angle $\theta_{est}$=−90−swing angle α] where the swing angle α is a change in the orientation of the vehicle that is caused during the movement of the vehicle from an initial position before the user's turning of the steering wheel to the parking start position). As for the swing angle α the counter clockwise direction is defined as a positive direction, and the clockwise direction is defined as a negative direction. Therefore, if the swing angle a is negative, the deflection angle θ is negative, and is computed as [deflection angle $\theta_{est}$=−90−swing angle α]. Therefore, estimation of the swing angle a makes it possible to estimate the deflection angle θ.

Normally, the swing angle α is computed as in Equation 1 where ds is an infinitesimal moving distance of the vehicle and γ is the curvature of the road surface (corresponding to the reciprocal of the turning radius R of the vehicle). Equation 1 determines a swing angle α as a change in the orientation of the vehicle involved in the movement up to the present point from a point that is β meters behind.

$$\alpha = \int_\beta^0 \gamma \cdot ds \tag{1}$$

The parking assist ECU 12 of this embodiment computes an infinitesimal swing angle $\alpha_i$ for every predetermined moving distance (0.5 m in this embodiment), and computes a swing angle α by summing the computed infinitesimal swing angles $\alpha_{1\ to\ k}$, on the basis of Equation 2 modified from Equation 1.

$$\alpha = \sum_{i=1}^{k} \alpha_i \tag{2}$$

$$\alpha_i = \int_{0.5}^{0} \gamma \cdot ds \tag{3}$$

The predetermined moving distance (0.5 m in this embodiment) is monitored through time integration of the output signal (tire wheel speed pulses). The road surface curvature γ (corresponding to the reciprocal of the turning radius R of the vehicle) is determined on the basis of the steering angle Ha obtained from the steering angle sensor 16; for example, it is calculated as γ=Ha/L·ρ where L is the wheelbase and ρ is the overall steering gear ratio (the ratio of the steering angle Ha to the steering angle of the tire wheels)). The infinitesimal swing angle $\alpha_i$ may also be computed by multiplying the road surface curvature γ acquired every 0.01 m of infinitesimal moving distance by 0.01 of the infinitesimal moving distance, and integrating the thus-multiplied values for 0.5 meter. The relationship between the road surface curvature γ and the steering angle Ha may be stored in the ROM of the parking assist ECU 12 as a map prepared on the basis of correlated data acquired for each vehicle beforehand.

The parking assist ECU 12 of this embodiment constantly computes infinitesimal swing angles $\alpha_i$ on the basis of the output signals of the steering angle sensor 16 and the vehicle speed sensor 18, and stores the computed infinitesimal swing angle $\alpha_i$ into the storage means 12a while the vehicle is running. That is, every time the moving distance of the vehicle reaches 0.5 m during driving the vehicle, the parking assist ECU 12 computes an infinitesimal swing angle $\alpha_i$ for the present moving distance of 0.5 m. The storage means 12a stores at least fourteen infinitesimal swing angles $\alpha_{1\ to\ 14}$ where the infinitesimal swing angle $\alpha_{14}$ is the newest infinitesimal swing angle computed and the infinitesimal swing angle $\alpha_1$ is the infinitesimal swing angle computed thirteen calculation cycles before. Therefore, the data in the storage means 12a is updated with a newly computed infinitesimal swing angle $\alpha_i$ every time the vehicle moves by 0.5 meter. The storage means 12a always stores at least 14 latest infinitesimal swing angles $\alpha_{1\ to\ 14}$ (i.e., the infinitesimal swing angles $\alpha_{1\ to\ 14}$ computed in the last movement section of 7 m).

The infinitesimal swing angle data stored in the storage means 12a is all erased at the time point when the ignition switch is turned off. Therefore, after the ignition switch is turned on and the vehicle starts running, infinitesimal swing angles are serially stored into the storage means 12a. After the running distance of the vehicle reaches 7 meters, the storage means 12a is always in a state where the parking assist ECU 12a stores the latest 14 infinitesimal swing angle $\alpha_{1\ to\ 14}$.

When estimation of the deflection angle θ becomes necessary (e.g., when the vehicle is stopped at a parking start position), the parking assist ECU 12 retrieves from the storage means 12a the latest 14 infinitesimal swing angle $\alpha_{1\ to\ 14}$ and sums the infinitesimal swing angle $\alpha_{1\ to\ 14}$ to compute the swing angle a that is needed to estimate the deflection angle θ (in this case, the change in the orientation of the vehicle involved in the movement up to the present point from the point located 7 meters behind). Corresponding to the sign of the estimated swing angle α, the parking assist ECU 12 selectively uses one of the equations, [deflection angle $\theta_{est}$=90–swing angle α] and [deflection angle $\theta_{est}$=−90–swing angle α], to determine the deflection angle $\theta_{est}$.

According to the embodiment, since the process of computing and storing infinitesimal swing angles $\alpha_i$ during driving the vehicle, it is possible to realize a state where estimation of the deflection angle θ is always possible. That is, according to the embodiment, the deflection angle θ can be estimated regardless of when the vehicle stops. Furthermore, in the embodiment, the swing angle α is computed as "a change in the orientation of the vehicle occurring during the run to the stopped position from about 7 meters behind, as mentioned above. The numerical value of 7 m is based on a driver's driving characteristic that the driver starts to turn the steering wheel within about 7 m before the parking start position when moving to the parking start position. Therefore, according to the embodiment, since the driver-s driving characteristics are reflected in the calculation of the deflection angle θ, it becomes possible to estimate the deflection angle θ at high accuracy without determination regarding the straight running state of the vehicle. The invention is not limited to the numerical value, that is, 7 m. The value may be changed within the range of 7 m±2 m. Similarly, the movement distance of 0.5 m corresponding to the infinitesimal swing angles $\alpha_i$ may also be other appropriate values such as 0.25 m, 1.0 m, etc.

In the foregoing embodiment, when it becomes necessary to estimate a deflection angle θ, the parking assist ECU 12 may compute a swing angle α by adding the infinitesimal swing angle $\alpha_0$ being presently computed to the latest 14 infinitesimal swing angles $\alpha_i$ retrieved from the storage means 12a. The presently computed infinitesimal swing angle $\alpha_0$ is computed by multiplying the moving distance (<0.5 m) from the point of computation of the previous infinitesimal swing angle $\alpha_{14}$ to the stopped position by the road surface curvature γ of that moving distance. Therefore, if the vehicle stops at a point that is less than 5 m from the point of computation of the latest infinitesimal swing angle $\alpha_{14}$, the swing angle α needed for estimation of the deflection angle θ (in this case, the change in the orientation of the vehicle occurring during the movement to the present point from at least 7 m behind) can be computed with good accuracy.

Next, a parking assist apparatus in accordance with a second embodiment of the invention will be described. The parking assist apparatus of this embodiment estimates the deflection angle θ by an estimation technique as described above on the basis of the driving state of the vehicle up to the parking start position, and also estimates the aforementioned control parameters $(X_c, Z_c)$.

Figure 8:
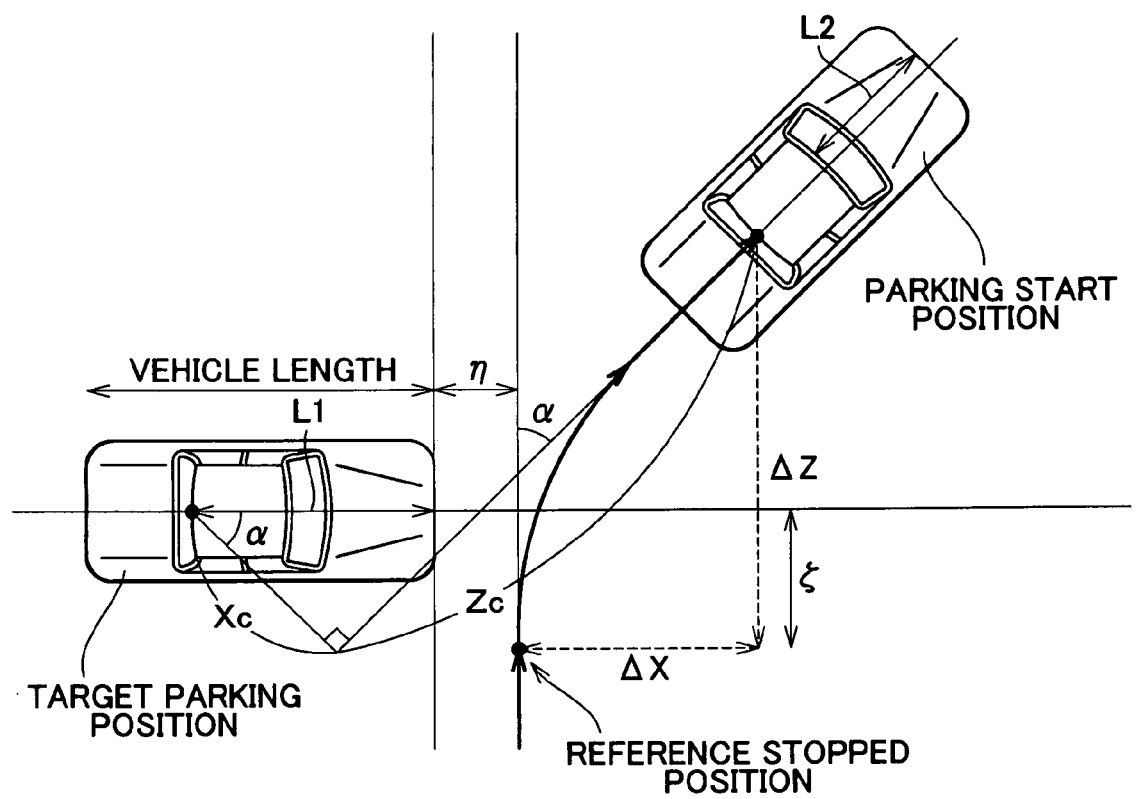
FIG. 8 illustrates a method of estimating the control parameters $(X_c, Z_c)$ in the first embodiment, and a method of computing a relationship of the target parking position with the parking start position in the second embodiment.

FIG. 8 is a diagram illustrating a technique for estimating the control parameters $(X_c, Z_c)$ in accordance with this embodiment. In this embodiment, the control parameter Xc (i.e., the x-coordinate of the center of the rear axle of the vehicle at the target parking position) is computed as in:

$$X_c = (L1 + \Delta X + \eta) \cdot \cos\alpha - (\Delta Z - \zeta) \cdot \sin\alpha \tag{4}$$

The control parameter Z (i.e., the z-coordinate of the center of the rear axle of the vehicle at the target parking position) is computed as in:

$$X_c = (L1 + \Delta X + \eta) \cdot \sin\alpha + (\Delta Z - \zeta) \cdot \cos\alpha \tag{5}$$

In the above-equations, L1 is the distance [m] from the center of the rear axle of the vehicle on a horizontal plane as indicated in FIG. 8. Furthermore, η is an adaptation parameter corresponding to the lateral interval between the front edge of the target parking position (space) and the longitudinal axis of the vehicle when the vehicle approaches the target parking position perpendicularly thereto. That is, η corresponds to the distance [m] in a horizontal plane from the longitudinal axis of the vehicle running substantially straight to the parking start position to a front end of the vehicle at the target parking position (distance therebetween in the direction of the longitudinal axis of the vehicle at the target parking position). In this embodiment, the adaptation parameter η is set as a fixed value, that is, η=1.5+vehicle width/2, taking the driver's driving characteristic into account.

Still further, ζ is an adaptation parameter corresponding to the distance [m] in a horizontal plane (distance in the transverse direction of the vehicle at the target parking position) between the longitudinal axis of the vehicle at the target parking position and the central point of the rear axle of the vehicle occurring at the beginning of the steering operation (more precisely, the starting point of computation of the infinitesimal swing angle $\alpha_{14}$). In this embodiment, the adaptation parameter ζ is set as a variable value dependent on the swing angle α, that is, ζ=α/90×(Rmin−2.7)+2.7 (where Rmin is the minimum turning radius of the vehicle). This is based on the driver's driving characteristic that the greater the swing angle α, the farther before the target parking position the driver starts to steer. Therefore, if the swing angle α is greater, the value of the adaptation parameter ζ also becomes greater.

In Equations 4 and 5, ΔX and ΔZ are computed as in Equations 6 and 7, respectively.

$$\Delta X = 0.5 \cdot \sum_{i=1}^{14} \sin\left(\sum_{K=1}^{i-1} \alpha_k + \frac{1}{2} \cdot \alpha_i\right) = 0.5 \cdot \sin\left(\frac{1}{2} \cdot \alpha_1\right) + \sin\left(\alpha_1 + \frac{1}{2} \cdot \alpha_2\right) + \sin\left(\alpha_1 + \alpha_2 + \frac{1}{2} \cdot \alpha_3\right) + \ldots \sin\left(\alpha_1 + \alpha_2 + \alpha_3 \ldots + \alpha_{13} + \frac{1}{2} \cdot \alpha_{14}\right) \tag{6}$$

-continued $$\Delta Z = 0.5 \cdot \sum_{i=1}^{14} \cos\left(\sum_{K=1}^{i-1} \alpha_k + \frac{1}{2} \cdot a_i\right) = 0.5 \cdot \cos\left(\frac{1}{2} \cdot \alpha_1\right) + \quad (7)$$

$$\cos\left(\alpha_1 + \frac{1}{2} \cdot \alpha_2\right) + \cos\left(\alpha_1 + \alpha_2 + \frac{1}{2} \cdot \alpha_3\right) + \ldots \cos$$

$$\left(\alpha_1 + \alpha_2 + \alpha_3 \ldots + \alpha_{13} + \frac{1}{2} \cdot \alpha_{14}\right)$$

In Equations 6 and 7, the numerical value of 0.5 corresponds to the aforementioned predetermined moving distance of 0.5 [m].

When estimation of the control parameters ($X_c$, $Z_c$) becomes necessary (e.g., when the vehicle stops at the parking start position), the parking assist ECU 12 of this embodiment retrieves the latest 14 infinitesimal swing angles $\alpha_{1\ to\ 14}$ from the storage means 12a, and computes $\Delta X$ and $\Delta Z$ through Equations 6 and 7. Then, using the computed $\Delta X$ and $\Delta Z$ as well as the aforementioned adaptation parameters, the parking assist ECU 12 computes the control parameters ($X_c$, $Z_c$) through Equations 4 and 5.

Similar to the above-described embodiment, this embodiment constantly performs the process of computing and storing an infinitesimal swing angle $\alpha_i$ while the vehicle is running. Therefore, according to the embodiment, estimation of the control parameters ($X_c$, $Z_c$) is possible whenever the vehicle stops. In this embodiment, the control parameters ($X_c$, $Z_c$) are computed using the adaptation parameters $\eta$, $\zeta$ based on the drivers driving characteristic. Therefore, according to the embodiment, the drivers driving characteristic is reflected in estimation of the control parameters ($X_c$, $Z_c$), so that the control parameters ($X_c$, $Z_c$) can be estimated with high accuracy.

The control parameters ($X_c$, $Z_c$) estimated as described above are used to determine an initial position of the target parking frame for garage parking in relation to the setting of a target parking position as described above in conjunction with the embodiments. That is, the parking assist ECU 12 of the embodiment initially displays the target parking frame on the display monitor 22 in the position and orientation corresponding to the control parameters ($X_c$, $Z_c$, $\theta_{est}$) estimated in the above-described fashion. Since the initial position of the target parking frame is estimated with high accuracy as mentioned above, it is unnecessary for the user to adjust the target parking frame by operating touch switches many times, and therefore it becomes possible to considerably reduce the time needed for setting the target parking position.

The second embodiment can be effectively combined with the first embodiment. For example, if in the first embodiment, the control parameters ($X_c$, $Z_c$) based on a past setting do not exist (i.e., at the time of initial setting), the control parameters ($X_c$, $Z_c$) estimated in accordance with the second embodiment may be used as substitutes for the default values.

A third embodiment of the parking assist apparatus of the invention will next be described.

This embodiment, as described in detail below, makes it possible to estimate the target parking position with high accuracy by detecting the stopped state of the vehicle and recognizing, as a target parking position, a position having a predetermined relation with the position of the vehicle occurring at the time of detection of the stopped state.

Hence, it becomes possible to initial-display the target parking frame in a desired target parking position from the beginning.

FIG. 9 is a diagram illustrating a target parking position estimating method for garage parking in accordance with the embodiment. In the target parking position estimating method of this embodiment, a precondition is that, as indicated in FIG. 9, the vehicle approaches a target parking position perpendicularly thereto, and temporarily stops at a center of the target parking position (a center line of the target parking position is indicated by a one-dot chain line in FIG. 9). After temporarily stopping at the center of the target parking position, the vehicle moves to a parking start position where the above-described setting of the target parking position is performed by the user.

Figure 10:
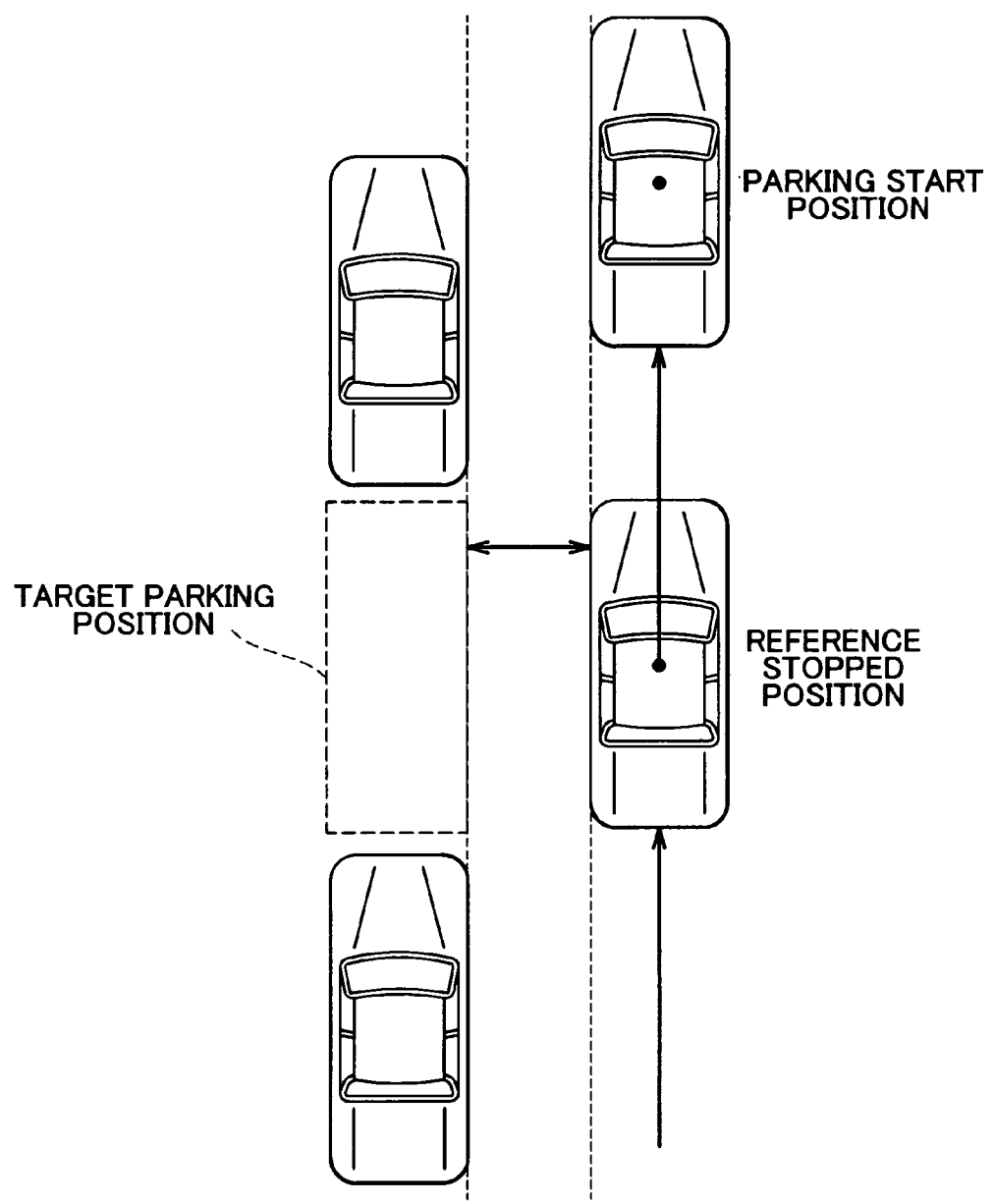
FIG. 10 illustrates a method of estimating a target parking position for parallel parking in accordance with the invention.

FIG. 10 is diagram illustrating a target parking position estimating method for parallel parking in accordance with this embodiment. In the target parking position estimating method of this embodiment, a precondition is that, as indicated in FIG. 10, the vehicle approaches the target parking position parallelly thereto, and temporarily stops at a center of the target parking position (center thereof in the longitudinal direction). After temporarily stopping at the center of the target parking position, the vehicle moves to reach a parking start position where the above-described setting of the target parking position is performed by the user.

The parking assist ECU 12 of this embodiment, upon detecting a temporarily stopped state of the vehicle on the basis of the output signal of the vehicle speed sensor 18, determines whether the steering angle occurring during the temporarily stopped state is within a predetermined range centered at a neutral position. If the steering angle is in the predetermined centered at the neutral position, the parking assist ECU 12 recognizes a position having a predetermined relationship with the vehicle position (i.e., stopped position) occurring during the temporarily stopped state, as a target parking position. Hereinafter, the stopped position of the vehicle that serves as a reference for recognition of the target parking position will be referred to as "reference stopped position".

Furthermore, the parking assist ECU 12 computes the positional relationship of the reference stopped position with the parking start position by computing the amount of movement of the vehicle from the reference stopped position to the parking start position. Then, on the basis of the computed positional relationship of the reference stopped position with the parking start position, the parking assist ECU 12 identifies a target parking position having a predetermined positional relationship with the reference stopped position (i.e., computes the positional relationship of the target parking position with the parking start position). Furthermore, on the basis of the computed positional relationship of the target parking position with the parking start position, the parking assist ECU 12 determines an initial display position of the target parking frame. Then, the parking assist ECU 12 causes the target parking frame to be initially displayed at the determined display position. Incidentally, the predetermined relationship between the reference stopped position and the target parking position may be pre-stored in the ROM of the parking assist ECU 12.

Thus, according to this embodiment, the driver needs only to temporarily stop the vehicle at a position having a predetermined relationship with the target parking position (the central point of the target parking position in the lateral direction in this embodiment) so that a target parking position having a predetermined relationship with the temporary stopped position (reference stopped position) will be recognized. Therefore, the embodiment allows recognition of a target parking position without the need for switch operations performed by a driver, and therefore reduces the operation burden on the driver. Furthermore, according to the embodiment, the target parking position is recognized/ estimated as a position having a predetermined relationship with the reference stopped position, on a predetermined assumption as mentioned above. Therefore, as long as the predetermined assumption is realized by a user (i.e., as long as the vehicle is stopped at a position having a predetermined relationship with the target parking position), a considerably improved accuracy in estimating the target parking position is achieved. As a result, it becomes possible to initial-display the target parking frame in a position close to a desired target parking position on the display monitor 22 from the beginning. Hence, the time needed for positional adjustment of the target parking frame is considerably reduced, and the total time needed for automatic parking can be reduced. That is, a mere user's temporary stop of the vehicle such that a predetermined assumption is met achieves a considerable improvement in the accuracy in estimation of the target parking position, so that the total time needed for automatic parking can be reduced.

In this embodiment, the target parking position is recognized/estimated on the assumption that the reference stopped position (more precisely, the position of the driver in the vehicle at the reference stopped position) corresponds to the center of the target parking position. However, another assumption may be made which different from this assumption. For example, it may be assumed that the position of the driver in the vehicle at the reference stopped position corresponds to a position of the rear end of the vehicle or the like in the forward direction of the target parking position. It is desirable that such an assumption or precondition be clearly stated in the user's manual or the like so that the users will be aware of the assumption. Such assumptions or preconditions may be prepared in various kinds and may be selectable so as to meet users' various preferences.

FIG. 11 is a flowchart illustrating a specific process routine executed by the parking assist ECU 12 in the embodiment so as to estimate the target parking position with high accuracy as described above. This process routine is activated when the ignition switch is turned on.

In step 400, it is determined whether the vehicle has changed from a running state to a stopped state. The change of the vehicle from the running state to the stopped state is detected on the basis of the output signal of the vehicle speed sensor 18 in step 400. If it is determined in step 400 that the running state of the vehicle is continuing, this process routine ends without any further processing. Conversely, if the stopped state of the vehicle (state where the vehicle speed is zero) is detected in step 400, the process proceeds to step 410.

In step 410, it is determined whether the steering angle occurring at the time of detection of the stopped state of the step 400 is within a predetermined range centered at the neutral position (e.g., 0±15 [deg]). If the steering angle at the time of detection of a stopped state is outside a predetermined range centered at the neutral position, it is considered that the stopped position detected in step 400 can be the aforementioned reference stopped position. The process then proceeds to step 420.

In step 420, a pre-process for computation of the relationship of the present vehicle position with the stopped position detected in step 400 is executed. The process of step 420 is executed if the change from the stopped state detected in step 400 to the running state is detected. In step 420, an infinitesimal swing angle $\alpha_i$ of the vehicle is computed. The infinitesimal swing angle $\alpha_i$ is the amount of change in the orientation of the vehicle caused during the run of a predetermined distance (0.5 m in this embodiment), and is computed through Equations 8 and 9. The positive sign for the infinitesimal swing angle $\alpha_i$ is defined for the clockwise changing of the orientation of the vehicle (therefore, the sign of the infinitesimal swing angle $\alpha_i$ is negative in the case opposite from the case shown in FIG. 10, that is, if the vehicle approaches the target parking position from a middle left side in FIG. 10, and then moves toward a parking start position in such a direction as to move away from the target parking position).

$$\alpha = \sum_{i=1}^{k} \alpha_i \qquad (8)$$

$$\alpha_i = \int_{0.5}^{0} \gamma \cdot ds \qquad (9)$$

Description of the road surface curvature $\gamma$ is omitted herein since the road surface curvature $\gamma$ has been described in conjunction with the first embodiment.

The infinitesimal swing angle $\alpha_i$ computed for every moving distance of 0.5 m in step 420 is written into the RAM of the parking assist ECU 12 in an appropriate fashion. Therefore, in step 420, every time the vehicle moves 0.5 m from the stopped position detected in step 400, an infinitesimal swing angle $\alpha_i$, that is, the amount of change in the orientation of the vehicle caused during the movement of 0.5 m, is computed, and the infinitesimal swing angle $\alpha_i$ is written into the RAM of the parking assist ECU 12.

Subsequently in step 430, it is determined whether the vehicle has become the stopped state within a predetermined moving distance $D_{thr1}$ (e.g., 6.5 m) after the stopped state detected in step 400, and the reverse shift switch 50 and the parking switch 52 are both turned on. If it is determined in step 430 that the vehicle did not become the stopped state within the predetermined moving distance $D_{thr1}$ following the stopped state detected in step 400 (i.e., if the vehicle continues running at least 6.5 m without a stop), it is considered that the stopped position detected in step 400 is not a reference stopped position. Then, the infinitesimal swing angle data written into the RAM of the parking assist ECU 12 is erased, and the process routine ends. Conversely, if it is determined in step 430 that the vehicle has become the stopped state within the moving distance $D_{thr1}$ following the stopped state and the reverse shift switch 50 and the parking switch 52 are both turned on, the process proceeds to step 440.

In step 440, it is determined that the stopped position detected in step 400 is a reference stopped position, and it is determined that the present vehicle position (i.e., the stopped position following the reference stopped position) is the parking start position, and a relationship of the target parking position with the parking start position is computed. In step 440, the relationship of the parking start position with the reference stopped position is first computed. Subsequently, on the assumption that the reference stopped position is the center of the target parking position (center thereof in the lateral direction), the position having a predetermined relationship with the reference stopped position is recognized as a target parking position. Finally, the relationship of the target parking position with the parking start position is computed.

More specifically, in the case of garage parking, the relationship of the target parking position with the parking start position as indicated in FIG. 8, that is, the coordinates ($X_c$, $Z_c$) of the target parking position with reference to the parking start position, is computed as in:

$$X_c = (L1 + \Delta X + \eta) \cdot \cos \alpha - (\Delta Z - \zeta) \cdot \sin \alpha \quad (10)$$

$$Z_c = (L1 + \Delta X + \eta) \cdot \sin \alpha + (\Delta Z - \zeta) \cdot \cos \alpha \quad (11)$$

The coordinates ($X_c$, $Z_c$) of the target parking position are defined in a two-dimensional coordinate system as indicated in FIG. 8, with the origin being at the center of the rear axle, the X-axis corresponding to the vehicular transverse direction and the Z-axis corresponding to the vehicular longitudinal direction. In Equations 10 and 11, L1 is the distance [m] in a horizontal plane from the center of the rear axle of the vehicle to the front end portion of the vehicle. Furthermore, $\alpha$ is the amount of change in the orientation of the vehicle (swing angle $\alpha$) caused in the movement from the reference stopped position to the parking start position, and is computed by adding up the infinitesimal swing angles $\alpha_i$ computed in step 420 (see Equations 8, 9).

In Equations 10 and 11, $\eta$ is the spacing between the longitudinal axis of the vehicle at the reference stopped position and the front line of the target parking position in the lateral direction. In this embodiment, $\eta = 1.5 + $vehicle width/2 is set. Furthermore, $\zeta$ is a constant that determines the aforementioned predetermined relationship between the reference stopped position and the target parking position, and is determined by the aforementioned assumption. In this embodiment, the constant $\zeta$ corresponds to the distance [m] in the vehicular longitudinal direction in a horizontal plane between the center of the rear axle of the vehicle at the reference stopped position and the center line of the target parking position. Therefore, on the assumption that the position of the driver in the vehicle at the reference stopped position is at the center of the target parking position, the constant $\zeta$ is defined as $\zeta = L1 - L2$ where L2 is the distance from the front end of the vehicle to the position of the driver (see FIG. 8).

Furthermore, $\Delta X$ and $\Delta Z$ in Equations 8 and 9 are computed as in Equations 12 and 13, respectively.

$$\Delta X = 0.5 \circ \sum_{i=1}^{m} \sin\left(\sum_{k=1}^{i-1} \alpha_k + \frac{1}{2} \circ \alpha_i\right) \quad (12)$$

$$\Delta Z = 0.5 \circ \sum_{i=1}^{m} \cos\left(\sum_{k=1}^{i-1} \alpha_k + \frac{1}{2} \circ \alpha_i\right) \quad (13)$$

In Equations 12 and 13, the numerical value of 0.5 corresponds to the aforementioned predetermined moving distance of 0.5 [m]. Furthermore, $\alpha_k$ and $\alpha_i$ are infinitesimal swing angles $\alpha_i$ computed in step 420, and the suffixes k, i are natural numbers assigned to computation results in the increasing order starting with "1" given to the very first computation result. Therefore, the infinitesimal swing angle for the run interval of 0.5 m from the reference stopped position is $a_1$. Furthermore, the infinitesimal swing angle $\alpha_m$ ($m \leq 13$ in the case of $D_{thr1} = 6.5$) is the latest computation result, and may also be a result of computation for a run interval less than 5 m that is immediately before the parking start position. Thus, in step 440, $\Delta X$ and $\Delta Z$ computed through Equations 12 and 13 are substituted in Equations 10 and 11 so as to compute the coordinates ($X_c$, $Z_c$) of the target parking position.

In the case of parallel parking, the coordinates ($X_c$, $Z_c$) of the target parking position are computed as in:

$$X_c = \delta \quad (14)$$

$$Z_c = \Delta Z + \epsilon \quad (15)$$

In Equation 14, the constant $\delta$ is a lateral spacing between the longitudinal axis of the vehicle at the reference stopped position and the longitudinal axis of the vehicle at the target parking position. In this embodiment, the constant $\delta$ is set as $\delta = 1.5 + $vehicle width/2, similar to the aforementioned constant $\eta$. In Equation 15, the constant $\epsilon$ determines the aforementioned predetermined relationship between the reference stopped position and the target parking position, and is determined by the aforementioned assumption. In this embodiment, the constant $\epsilon$ is set at zero on the assumption that the center position of the vehicle at the reference stopped position corresponds to the center of the target parking position. In Equation 15, $\Delta Z$ is the moving distance from the reference stopped position to the parking start position (which can be computed through time integration of the output signal (tire wheel speed pulses) of the vehicle speed sensor 18). If the aforementioned assumption includes a plurality of assumed matters, the constant $\epsilon$ and the constant $\delta$ are correspondingly prepared in plural kinds.

Subsequently in step 450, the target parking frame is initially displayed at the position on the display monitor 22 that corresponds to the coordinates ($X_c$, $Z_c$) of the target parking position computed in step 440. If the system is designed to prompt a user to select the kind of parking intended, the initial display of the target parking frame may be carried out by using a result of the aforementioned computation corresponding to the selected kind of parking (garage parking or parallel parking). It is also possible to anticipate the intended kind of parking in accordance with the value of the computed swing angle $\alpha$ (e.g., if the swing angle a is substantially zero, parallel parking is anticipated). In that case, a result of the aforementioned computation corresponding to the anticipated kind of parking is used to carry out the initial display of the target parking frame. It is to be noted herein that the coordinates of the target parking frame on the display monitor 22 one-to-one correspond to the coordinates of the target parking position due to predetermined converting equations. When the process of step 450 ends, the process routine ends. Following the end of the process of step 450, the target parking frame is initially displayed on the display monitor 22. Since the initial position of the target parking frame is estimated with high accuracy as mentioned above, the subsequent operation by user to adjust the position of the target parking frame becomes easy or unnecessary. Thus, the total time needed for automatic parking can be reduced.

The stopped state of the vehicle is detected not only when the vehicle stops at the reference stopped position, but also in various other situations (e.g., when the vehicle stops for traffic signals, or temporarily stops at an intersection). Therefore, if every stopped state of the vehicle detected is recognized as a candidate for the reference stopped position, it is necessary to select only one appropriate reference stopped position from many candidates. However, in a construction that does not depend on switch operations performed by a user or results of detection by special sensors (distance measuring sensor) in particular, it is difficult to select an appropriate reference stopped position from many candidates. If an inappropriate reference stopped position is selected from many candidates, there occurs an inconvenience where the target parking frame is initially displayed in a position that is greatly different from the desired target parking position.

In the embodiment, however, although every stopped state of the vehicle detected is recognized as a candidate for the reference stopped position, the reference stopped position selected finally (i.e., when the vehicle reaches a parking start position) is a stopped position existing within the predetermined moving distance $D_{thr1}$ (6.5 m in this embodiment) prior to the parking start position. The predetermined moving distance $D_{thr1}$ is set such that the stopped positions other than the aforementioned reference stopped position (particularly, the stopped positions at which the vehicle stops before the actual reference stopped position) can be excluded from the candidates for the reference stopped position, and is set as an upper limit value that allows safe and appropriate accomplishment of parking assist control. Therefore, according to the embodiment, it is possible to select only one appropriate reference stopped position from many candidates. Hence, the accuracy in estimating the target parking position and the reliability of the parking assist control will improve.

Furthermore, in this embodiment, a stopped position where the steering angle is substantially neutral is recognized as a candidate for the reference stopped position. Therefore, particularly in the case of garage parking, if the vehicle is stopped between the actual reference stopped position and a vicinity of the parking start position (in such a case, the driver has operated the steering wheel, so that the steering angle considerably deviates from the neutral position when the vehicle is stopped), this stopped position can be excluded from the candidates for the reference stopped position.

If in the case of parallel parking, the vehicle is stopped between the actual reference stopped position and the vicinity of the parking start position, the steering angle is substantially at the neutral position, so that this stopped position is recognized as a candidate for the reference stopped position. In that case, the process routine illustrated in FIG. 11 is parallelly and concurrently executed so as to provide at least two stopped positions as candidates for the reference stopped position. It is also possible to adopt a construction in which the stopped position within a predetermined moving distance $D_{thr2}$ (e.g., 2.0 m) prior to the parking start position is excluded from the candidates for the reference stopped position, and the stopped position that minimizes the moving distance to the parking start position (to a minimum value of within the range of 2.0 m to 6.5 m) is selected as a reference stopped position.

Even in the case of garage parking, there can be an event where the stopped state is detected a plurality of times and the processes of steps 420 and 430 of the process routine in FIG. 11 simultaneously proceed in parallel, so that two or more stopped positions are determined as candidate for the reference stopped position. In such a case, an operation similar to that described above may be performed as follows. That is, the stopped position within the predetermined moving distance $D_{thr2}$ (e.g., 2.0 m) before the parking start position is excluded from the candidates for the reference stopped position, and the stopped position having a minimum moving distance to the parking start position (i.e., a minimum value within the range of 2.0 m to 6.5 m) is selected as a reference stopped position.

That is, in the embodiment, if the stopped state of the vehicle is not detected within the moving distance $D_{thr1}$ before the parking start position, the initial position of the target parking frame may be determined on the basis of the default value or the estimated value attained by a different estimation method.

According to the third embodiment, the initial position of the target parking frame is estimated on the basis of the driving state of the vehicle up to the parking start position. However, the relationship of the parking start position with the target parking position varies depending on the driving characteristics of individual drivers. The above-described estimation method cannot achieve complete reflection of the driving characteristics of individual drivers; in some cases, the initial position of the target parking frame does not match the position of the parking frame (including orientation thereof) intended by the user. In such a case, the user has to operate touch switches in similar manners every time it becomes necessary to conform the target parking frame to the user's intended parking space. Thus, there is a drawback of complicated operation for position adjustment.

According to the first and second embodiments, past setting of the target parking frame by the user are utilized to determine the initial position of the target parking frame as described above. Specifically, every time the target parking position is set, the result of the user's setting of the target parking frame is stored in an updating fashion into the storage means 12a at appropriate timing in step 230 or 330. Therefore, the control parameters in the storage means 12a correspond to the relationships of the parking start position with the target parking position specific to the user. Therefore, according to the embodiment, the control parameters corresponding to the relationships of the parking start position with the target parking position specific to the user are retrieved from the storage means 12a in steps 210 and 310. Thus, it becomes possible to initially display the target parking frame corresponding to the driving characteristics of individual users. Consequently, the embodiments eliminate the need for a user to perform similar adjustments of the target parking frame over and over again, and make it possible to considerably reduce the time needed for setting the target parking position.

While the invention has been described with reference to preferred embodiments thereof, the invention is not limited to the above-described embodiments. To the contrary, various modifications and equivalent arrangements may be applied to the foregoing embodiments without the spirit and scope of the invention.

For example, although in the first and second embodiments, the storage means 12a stores a set of control parameters $(X_c, Z_c)$ for each range of deflection angle $\theta$ in an updated fashion, a plurality of sets of control parameters $(X_c, Z_c)$ may be stored for each range of deflection angle $\theta$ (that is, the control parameters $(X_c, Z_c, \theta)$ may be arranged in a database fashion. In that case, average values $(X_{ave}, Z_{ave})$ of the plural sets of control parameters $(X_c, Z_c)$ may be retrieved by the parking assist ECU 12 for utilization in determining the initial position of the target parking position.

Furthermore, although in the first and second embodiments, after the control parameters $(X_c, Z_c, \theta)$ are computed, the control parameters $(X_c, Z_c)$ are stored in an update fashion in accordance with the deflection angle $\theta$, it is also possible to update-store the control parameters $(X_c, Z_c, \theta)$, i.e., including the deflection angle $\theta$, in accordance with the deflection angle $\theta$. In that case, in step 210, the control parameters $(X_c, Z_c, \theta)$ may be retrieved from the storage means 12a in accordance with the estimated deflection angle $\theta_{est}$ ($\theta_{est} \neq \theta$ is possible in this case). Subsequently in step

220, it is appropriate to execute the process of computing the display parameters ($X_m$, $Z_m$, $\theta_m$) corresponding to the control parameters ($X_c$, $Z_c$, $\theta$) and displaying the target parking frame on the display monitor 22 in the position and orientation based on the computed display parameters ($X_m$, $Z_m$, $\theta_m$). That is, in this construction, the deflection angle $\theta_{est}$ estimated on the basis of the driving state of the vehicle is used only to retrieve the control parameters ($X_c$, $Z_c$, $\theta$) from storage means 12a, and the orientation of the target parking frame to be initially display is determined by the retrieved control parameter $\theta$ (i.e., the deflection angle $\theta$ computed at the time of a past operation of determining the target parking frame).

Still further, in the first and second embodiments, the control parameters ($X_c$, $Z_c$) are stored in an updating fashion in accordance with the sign of the control parameter $X_c$ for the initial display of the target parking frame for the next or later operation. It is also naturally possible to store the display parameters ($X_m$, $Z_m$, $\theta_m$) into the storage means 12a in an updating fashion in accordance with the deflection angle $\theta$ or the sign of the control parameter $X_c$.

For example, in the third embodiment, final determination of the target parking position is left for a user to accomplish, thereby allowing flexible adaptation to user's intentions, for example, an intention to park the vehicle at a position deviating right or leftward from the center line of the actual target parking position or in an orientation inclined with respect to the center line because of various circumstances, for example, an obstacle near the target parking position, the convenience for opening and closing a door, etc. In another possible construction, however, the target parking position estimated as described above may be determined as a final target parking position.

Furthermore, although in the third embodiment the infinitesimal swing angle $\alpha_i$ is computed on the basis of the output signals of the vehicle speed sensor and the steering angle sensor, the infinitesimal swing angle $\alpha_i$ may also be computed on the basis of the output signals of the vehicle speed sensor and a yaw rate sensor.

According to the first and second embodiments, the target parking frame can be initially displayed in the position (including orientation) corresponding to the driving characteristics of individual drivers.

According to the third embodiment, it is possible to estimate the target parking position with high accuracy without the need for switch operations performed by a user nor the need for addition of a sensor. Therefore, the time needed for setting the target parking position can be reduced, and the usefulness of the parking assist control will improve.

What is claimed is:

1. A parking assist apparatus comprising:
    a display device that displays an actual image of surroundings of a vehicle and a target parking frame indicating a target parking position where the vehicle is to be parked;
    an initial display control device that initially displays the target parking frame on the display device by using a past setting of the target parking position performed by a user; and
    a guide device that automatically guides the vehicle to the target parking position.

2. The parking assist apparatus according to claim 1, further comprising:
    a control parameter computing device that computes an amount of movement of the vehicle and an amount of change in orientation of the vehicle that are needed in order to guide the vehicle from a parking start position to the set target parking position, as control parameters;
    a storage device that stores the computed control parameters in association with the computed amount of movement and the computed amount of change; and
    an estimation device that estimates the target parking position based on a driving state of the vehicle up to the parking start position, and that estimates the amount of movement and the amount of change that are needed in order to guide the vehicle from the parking start position to the estimated target parking position, wherein the initial display control device retrieves the control parameters corresponding to the estimated amount of movement and the estimated amount of change from the storage device, and initially displays the target parking frame on the display device based on the retrieved control parameters.

3. The parking assist apparatus according to claim 2, wherein the estimation device constantly computes and stores the change in orientation of the vehicle for every predetermined travel distance during driving the vehicle, and estimates the amount of change based on the stored change in orientation of the vehicle.

4. A parking assist apparatus comprising:
    an estimation device that estimates an amount of movement of a vehicle and an amount of change in orientation of the vehicle that are needed for guiding the vehicle from a parking start position to a target parking position, as control parameters, based on a driving state of the vehicle up to the parking start position, in order for a user to set the target parking position by moving a target parking frame displayed together with an actual image of surroundings of the vehicle in an garage parking assist operation; and
    an initial position determination device that determines an initial display position of the target parking frame based on the estimated control parameters, wherein the estimation device constantly computes and stores the change in orientation of the vehicle for every predetermined travel distance during driving the vehicle, and estimates the control parameters based on the stored change in orientation of the vehicle.

5. A parking assist method comprising:
    a first step of initially displaying a target parking frame in a screen of a display device displaying an actual image of surroundings of a vehicle by using a past setting of a target parking position performed by a user; and
    a second step of automatically guiding the vehicle to the target parking position set by the user moving the target parking frame displayed together with the actual image of surroundings of the vehicle.

6. A parking assist method comprising:
    a first step of constantly computing and storing the change in orientation of the vehicle for every predetermined travel distance during driving a vehicle;
    a second step of estimating an amount of movement of the vehicle and an amount of change in orientation of the vehicle that are needed for guiding the vehicle from a parking start position to a target parking position, as control parameters, based on a driving state of the vehicle obtained before the vehicle reaches the parking start position, which includes the stored change in orientation of the vehicle;
    a third step of determining an initial display position of the target parking frame based on the estimated control parameters;

a fourth step of displaying a target parking frame to the determined initial display position together with an actual image of surroundings of the vehicle;

a fifth step of setting a position of the target parking frame which is moved by the user, as the target parking position; and a sixth step of guiding the vehicle to the target parking position in the garage parking operation.

7. A parking assist apparatus comprising:

a detection device that detects a stopped state of a vehicle;

a recognition device that, if the stopped state of the vehicle is detected by the detection device, recognizes a position having a predetermined relationship with a first stopped position of the vehicle occurring when the stopped state is detected, as a target parking position; and a guide device that automatically guides the vehicle to the target parking position.

8. The parking assist apparatus according to claim 7, further comprising a display device that displays the recognized target parking position together with an actual image of surroundings of the vehicle.

9. The parking assist apparatus according to claim 8, further comprising a manual operation device that moves and adjusts a display position of the target parking position in accordance with a switch operation.

10. The parking assist apparatus according to claim 7, wherein if a steering angle being substantially at a neutral position is detected in addition to the stopped state of the vehicle, the recognition device recognizes, as the target parking position, the position having the predetermined relationship with the first stopped position of the vehicle.

11. The parking assist apparatus according to claim 7, wherein the recognition device recognizes the position having the predetermined relationship with the first stopped position as at least one candidate for the target parking position, and recognizes a candidate among the at least one candidate which is recognized with reference to a second stopped position having a predetermined relationship with a present vehicle position that is apart from the first stopped position, as the target parking position.

12. The parking assist apparatus according to claim 11, wherein if a plurality of candidates exist, the recognition device recognizes, among the plurality of candidates, a candidate recognized with reference to the second stopped position that is nearest to the present vehicle position that is apart from the first stopped position, as the target parking position.

13. The parking assist apparatus according to claim 11, wherein if the candidate does not exist, the recognition device recognizes a preset position to which the vehicle is guidable with reference to the present vehicle position that is apart from the first stopped position, as the target parking position.

14. A parking assist method comprising:

detecting a stopped state of a vehicle;

recognizing, as a target parking position, a position having a predetermined relationship with a stopped position of the vehicle occurring when the stopped state of the vehicle is detected; and automatically guiding the vehicle to the target parking position.

15. The parking assist apparatus according to claim 1, wherein the past setting of the target parking position includes the user's operation of (i) moving a parking frame initially displayed on the display device to a desired parking position and setting the desired parking position as the target parking position, or (ii) setting the parking frame initially displayed on the display device as the target parking position.

16. The parking assist method according to claim 5, wherein the past setting of the target parking position is set by the user's operation of (i) moving a parking frame initially displayed on the display device to a desired parking position and setting the desired parking position as the target parking position, or (ii) setting the parking frame initially displayed on the display device as the target parking position.

17. The parking assist apparatus according to claim 7, wherein, if the stopped state of the vehicle is detected by the detection device, the recognition device recognizes the position having the predetermined relationship with the stopped position of the vehicle occurring when the stopped state is detected as the target parking position without a switch operation by the user.

18. The parking assist method according to claim 14, wherein, if the stopped state of the vehicle is detected by the detection device, the recognition device recognizes the position having the predetermined relationship with the stopped position of the vehicle occurring when the stopped state is detected as the target parking position without a switch operation by the user.

19. The parking assist apparatus according to claim 7, wherein the stopped position is set as a reference stopped position only when a subsequent parking start position exists within a predetermined moving distance from the stopped position.

20. The parking assist apparatus according to claim 14, further comprising setting the stopped position as a reference stopped position only when a subsequent parking start position exists within a predetermined moving distance from the stopped position.

* * * * *